(12) United States Patent
Brittain

(10) Patent No.: US 8,798,660 B2
(45) Date of Patent: Aug. 5, 2014

(54) MESSAGE PROCESSING

(75) Inventor: Paul John Brittain, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 13/566,072

(22) Filed: Aug. 3, 2012

(65) Prior Publication Data

US 2013/0196696 A1 Aug. 1, 2013

(30) Foreign Application Priority Data

Aug. 3, 2011 (GB) .................................. 1113401.2

(51) Int. Cl.
*H04B 7/00* (2006.01)
(52) U.S. Cl.
USPC ........ 455/519; 455/445; 455/428; 455/456.1; 455/417
(58) Field of Classification Search
CPC ............................... H04W 4/02; H04W 4/021
USPC ........................ 455/519, 445, 428, 456.1, 417
See application file for complete search history.

(56) References Cited

U.S. PATENT DOCUMENTS

| | | | |
|---|---|---|---|
| 6,192,234 B1 | 2/2001 | Chavez, Jr. | |
| 7,047,026 B1 | 5/2006 | Farhang et al. | |
| 2003/0125072 A1* | 7/2003 | Dent | 455/551 |
| 2007/0082668 A1 | 4/2007 | Silver et al. | |
| 2010/0136980 A1* | 6/2010 | Linquist et al. | 455/445 |
| 2011/0313915 A1* | 12/2011 | Tang | 705/39 |
| 2012/0088476 A1* | 4/2012 | Greenfield | 455/414.1 |
| 2012/0157112 A1* | 6/2012 | Erb et al. | 455/456.1 |

FOREIGN PATENT DOCUMENTS

| | | |
|---|---|---|
| EP | 1463360 A1 | 9/2004 |
| WO | 0005862 A1 | 2/2000 |

OTHER PUBLICATIONS

"What is Gypsii? A Gypsii Profile and User Reviews", http://webtrends.about.com/od/profiles/fr/Gypsii-profile.htm, last visited Jan. 12, 2010, 2 pages.
"Sending email from different addresses in mail.app—Mac OS X Hints", http://www.macosxhints.com/article.php?story=20010401111133239, last visited Jan. 13, 2010, 4 pages.
Imielinski et al., "GPS-Based Geographic Addressing, Routing, and Resource Delivery", Communications of the ACM, Apr. 1999/vol. 42, No. 4.

* cited by examiner

*Primary Examiner* — Barry Taylor
(74) *Attorney, Agent, or Firm* — EIP US LLP

(57) ABSTRACT

Processing an incoming request message and transmitting outgoing request messages to telephony devices located in various different geographic regions of a telephony system are provided. The telephony devices include at least one group of potential recipient telephony devices. A group of potential recipient devices include mobile telephony devices that can move between the various different geographic regions. An incoming request message comprising a telephony party identifier is received. The telephony party identifier is recognized as a telephony party identifier to be subject to location-based processing. A subgroup, including a plurality of potential recipient telephony devices currently within one or more target geographic regions associated with the recognized telephony party identifier, of the group of potential recipient telephony devices is determined. An outgoing request message is transmitted to each of a plurality of different telephony party identifiers, each being associated with a different potential recipient telephony device in the subgroup.

20 Claims, 21 Drawing Sheets

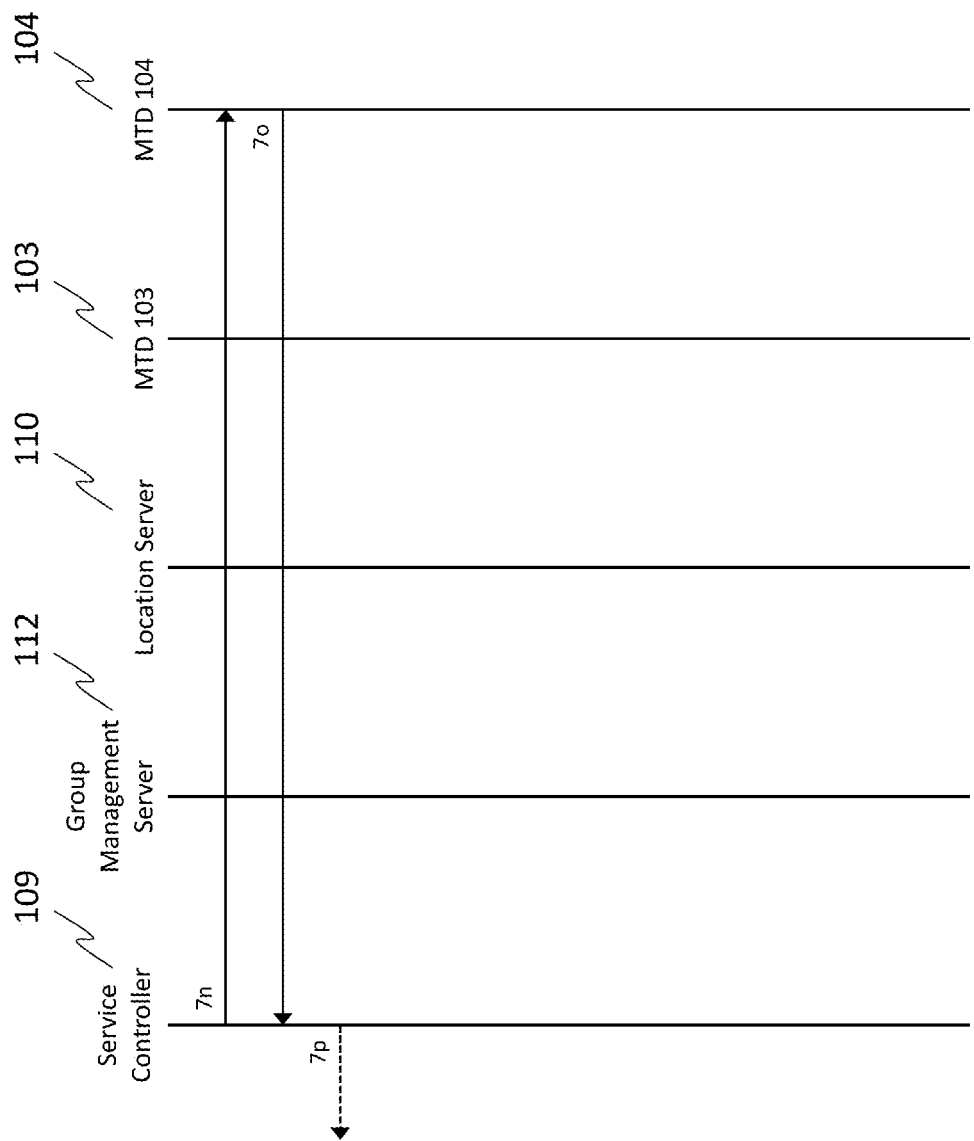

1

MESSAGE PROCESSING

CROSS REFERENCE TO RELATED APPLICATION

This application claims priority to foreign Patent Application No. GB 1113401.2, filed on Aug. 3, 2011, the disclosure of which is incorporated herein by reference in its entirety.

TECHNICAL FIELD

The present invention relates to methods of and apparatuses for processing messages, in particular but not exclusively in a telephony network.

BACKGROUND

As a result of continued improvements to the quality and range of services offered by Mobile Network Operators (MNOs) and related services that can be accessed from, and provided by mobile telephones, mobile telephones are increasingly being used as the primary telephony device for users. Even if a user is located at home, where they have access to a landline telephone, they often use their mobile telephone in preference to the landline telephone.

One known system automatically selects profiles based on location. The location of a wireless device is determined, a user's preferences in a database is obtained, and a telephone call is routed to the user based on the user's preferences and the location of the wireless device. Hence, a user defines a profile, based on which a telephone call is routed to a user.

Another known system provides a telecommunications device that includes a first telephone line enabling access to a telecommunications network and a second telephone line enabling access to a telecommunications network. A selection apparatus is included which in response to an entered outgoing call number and a user generated input enables selection of one of the first and second telephone lines for supporting a call connection between the telecommunications device and the outgoing called number over the telecommunications network. The selection between the first and second outgoing telephone lines is achieved using a database associated with the telecommunications device. The database includes a listing of outgoing call numbers wherein each of the outgoing call numbers has a particular telephone line associated therewith. Thus, when a particular outgoing call number is entered, the database is searched and upon finding the outgoing call number, the call is made using the telephone line associated with the outgoing call number. The user creates the database listings through an interface of the telecommunications device. Hence, the user needs to create a database of outgoing call numbers to define how outgoing calls are processed.

It would be desirable to provide improved methods and apparatus for providing telephony services for users.

SUMMARY

In accordance with a first exemplary embodiment of the invention, a method of processing an incoming request message and transmitting outgoing request messages to telephony devices located in various different geographic regions of a telephony system is provided. The telephony devices in the telephony system including at least one group of potential recipient telephony devices. A said group of potential recipient devices including mobile telephony devices that can move between said various different geographic regions. An incoming request message is received. The incoming request message comprises a telephony party identifier. The telephony party identifier is recognised as a telephony party identifier to be subject to location-based processing. A subgroup of said group of potential recipient telephony devices is determined. The subgroup includes one or more potential recipient telephony devices currently within one or more target geographic regions associated with the recognised telephony party identifier. An outgoing request message is transmitted to at least one of the one or more potential recipient telephony devices in said subgroup.

In accordance with a second exemplary embodiment of the invention, a method of processing a message in a telephony network is provided. A request message is received from an originating telephony device associated with a user. An originating telephony party identifier is selected from a plurality of possible originating telephony party identifiers. The possible originating telephony party identifiers are associated with different possible geographic locations of the user. An outgoing request message is transmitted using the selected originating telephony party identifier.

In accordance with a third exemplary embodiment of the invention, apparatus for processing an incoming request message and transmitting outgoing request messages to telephony devices located in various different geographic regions of a telephony system is provided. The telephony devices in the telephony system include at least one group of potential recipient telephony devices. A said group of potential recipient devices include mobile telephony devices that can move between said various different geographic regions. The apparatus is arranged to receive an incoming request message, the incoming request message comprising a telephony party identifier. The apparatus is arranged to recognise said telephony party identifier as a telephony party identifier to be subject to location-based processing. The apparatus is arranged to determine a subgroup of said group of potential recipient telephony devices, said subgroup including a plurality of potential recipient telephony devices currently within one or more target geographic regions associated with the recognised telephony party identifier. The apparatus is arranged to transmit an outgoing request message to each of a plurality of different telephony party identifiers associated with the plurality of potential recipient telephony devices in said subgroup, said plurality of different telephony party identifiers each being associated with a different potential recipient telephony device in said subgroup.

In accordance with a fourth exemplary embodiment of the invention, a computer program product comprising a non-transitory computer-readable storage medium having computer readable instructions stored thereon is provided. The computer readable instructions are executable by a computerized device to cause the computerized device to perform a method of processing an incoming request message and transmitting outgoing request messages to telephony devices located in various different geographic regions of a telephony system. The telephony devices in the telephony system include at least one group of potential recipient telephony devices. A said group of potential recipient devices includes mobile telephony devices that can move between said various different geographic regions. The method comprises receiving an incoming request message, the incoming request message comprising a telephony party identifier. The method comprises recognising said telephony party identifier as a telephony party identifier to be subject to location-based processing. The method comprises determining a subgroup of said group of potential recipient telephony devices, said subgroup including a plurality of potential recipient telephony devices currently within one or more target geographic regions associated with the recognised telephony party identifier. The method comprises transmitting an outgoing request message to each of a plurality of different telephony party identifiers associated with the plurality of potential recipient telephony devices in said subgroup, said plurality of different telephony party identifiers each being associated with a different potential recipient telephony device in said subgroup.

In accordance with a fifth exemplary embodiment of the invention, apparatus for processing a message in a telephony network is provided. The apparatus is arranged to receive a request message from an originating telephony device associated with a user. The apparatus is arranged to select an originating telephony party identifier from a plurality of possible originating telephony party identifiers. The possible originating telephony party identifiers are associated with different possible geographic locations of the user. The apparatus is arranged to transmit an outgoing request message using the selected originating telephony party identifier.

In accordance with a sixth exemplary embodiment of the invention, a computer program product comprising a non-transitory computer-readable storage medium having computer readable instructions stored thereon is provided. The computer readable instructions are executable by a computerized device to cause the computerized device to perform a method of processing a message in a telephony network. The method comprises receiving a request message from an originating telephony device associated with a user. The method comprises selecting an originating telephony party identifier from a plurality of possible originating telephony party identifiers. The possible originating telephony party identifiers are associated with different possible geographic locations of the user. The method comprises transmitting an outgoing request message using the selected originating telephony party identifier.

Further features and advantages of the invention will become apparent from the following description of preferred embodiments, given by way of example only, which is made with reference to the accompanying drawings.

BRIEF DESCRIPTION OF THE DRAWINGS

FIGS. 7A and 7B are a sequence diagram showing a method of processing an incoming call setup request in accordance with preferred embodiments;

DETAILED DESCRIPTION

Figure 1:
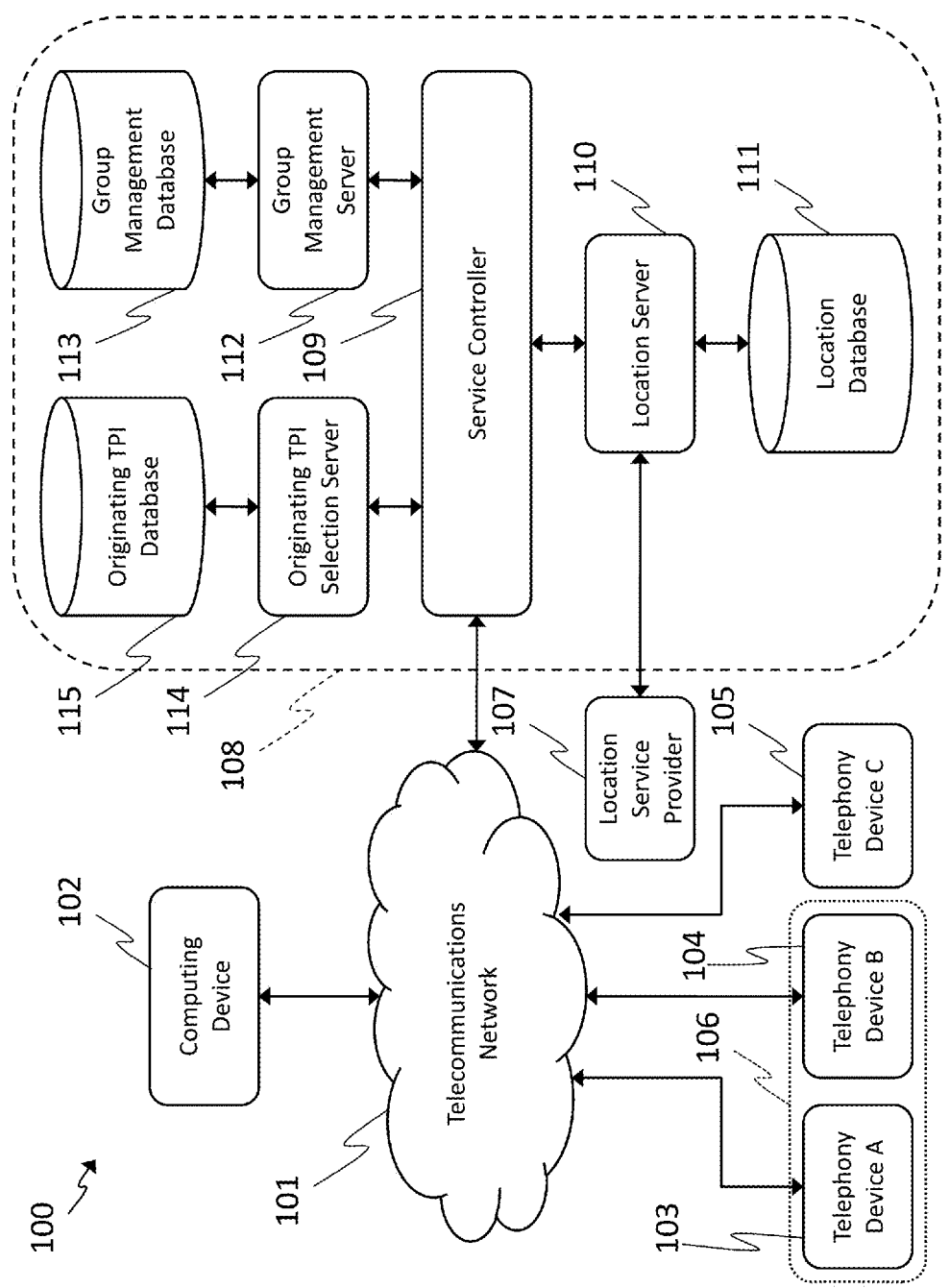
FIG. 1 is a schematic block diagram showing a system according to preferred embodiments.

FIG. 1 shows system diagram of a telecommunications system 100 according to preferred embodiments.

The telecommunications system 100 is a telephony system that processes an incoming request message and transmits outgoing request messages to telephony devices located in various different geographic regions of the telephony system 100. The telephony devices in the telephony system 100 include at least one group of potential recipient devices including mobile telephony devices that can move between the various different geographic regions. An incoming request message which comprises a telephony party identifier is received in the telephony system 100. The telephony party identifier is recognised as a telephony party identifier to be subject to location-related processing. A subgroup of the group of potential recipient telephony devices is determined, which subgroup includes one or more potential recipient telephony devices from the group currently within one or more target geographic region(s) associated with the recognised telephony party identifier. The subgroup may include all of the group, or only some, and not other, members of the group. The subgroup includes any number of members, but will preferably include more than one member, of the group. The one or more potential recipient telephony devices in the subgroup each has an associated telephony party identifier. An outgoing request message is transmitted to at least one of the telephony party identifiers associated with the one or more potential recipient telephony devices in the subgroup.

In the description below, the telephony party identifier to be subject to location-related processing will generally be referred to as a "location-related telephony party identifier", which will be understood accordingly. The location-related telephony party identifier may be associated at any particular time with zero telephony parties, with one telephony party, or with a plurality of telephony parties, and is preferably capable of being associated with differing numbers, from zero, to one, to a plurality of, different telephony parties at different times.

In other embodiments that will also be described in detail below, a request message is received in the telecommunications system 100 from an originating telephony user device associated with a user. An originating telephony party identifier for an outgoing request message is selected from a plurality of possible originating telephony party identifiers. The possible originating telephony party identifiers are associated with different possible locations of the user. An outgoing request message is transmitted using the selected originating telephony party identifier.

In some embodiments, the telecommunications system 100 includes a telephony network 101 which is or comprises a cellular telephony network such as a Global System for Mobile Communications (GSM) network.

The telecommunications system 100 includes a computing device 102, such as a personal computer (PC), for example a desktop, laptop or tablet computer, a Personal Digital Assistant (PDA) or the like. The computing device 102 includes a web browser application that enables the computing device 102, amongst other things, to retrieve Internet content from the World Wide Web, for example by making a telephone call to an Internet Service Provider (ISP) using a 'dial-up' connection over a Public Switched Telephone Network (PSTN) or Integrated Services Digital Network (IDSN) connection. The computing device 102 may be served by the telephony network 101 and/or by another suitable telecommunications network (not shown).

The telephony network 101 provides mobile telephony services to mobile telephony devices, three of which are shown in FIG. 1; namely mobile telephony devices 103, 104, 105. In some embodiments, the mobile telephony devices 103, 104, 105 are mobile telephones (also called cellular telephones). The mobile telephony devices 103, 104, 105 can move between the various different geographic regions served by the telephony network 101.

The mobile telephony devices 103, 104, 105 and their respective users are identified within the telecommunications system 100 by means of telephony party identifiers. Communications within the telephony network 101 are transmitted to or from a device using an appropriate telephony party identifier for the communication. The telephony party identifier may be modified during transmission through the telecommunications system 100 or may be transmitted intact.

A mobile telephony device 103, 104, 105 may be represented within the telephony network 101 by means of a telephony party identifier associated with the mobile telephony device (hereinafter referred to as a "mobile telephony party identifier"). The mobile telephony party identifier can take various different forms, depending upon the type of telephony service provided within the telephony network 101, the type of incoming request message, the capabilities of an originating and/or terminating telephony device and the like.

In some embodiments, the mobile telephony party identifier is a mobile telephone dialing number in the form of a Mobile Subscriber Integrated Digital Services Network (MSISDN) number. The MDISDN is the number that a calling party would typically input to an originating telephony device to initiate a telephone call to a mobile telephony device represented by the MSISDN.

A user of a mobile telephone device 103, 104, 105 may be represented by a user identifier (UID). A UID provides an identity for the user that can be a telephony party identifier which can be mapped to a different identifier for a telephony device associated with the user. Having separate identities for the user and their equipment provides user mobility within the telecommunications system 100. As such, a single user may be associated with multiple telephony devices (for example, a telephony device at work and a different telephony device at home). The user may 'log in' to any of the telephony devices with which they are associated using their UID so that communications to their UID are routed to the telephony device(s) at which they are currently logged in.

For example, the UID may be a Session Initiation Protocol Uniform Resource Identifier (SIP URI), which includes a username and a domain component. For example, a public (SIP) URI may be in the form sip:username@domain.com. The user can be contacted by addressing a SIP-compatible communication to the public (SIP) URI of that user. Since a user may be associated with several SIP URIs (for example personal and work SIP URIs), a registrar entity of the domain of the public URI tracks the location of the user so that a message addressed to the user's public URI can be mapped to the current location of the user and the message routed to the user accordingly. Whenever the user logs into a SIP-compatible device at a new location, the new location is registered with the registrar so that the registrar is aware of the current location of the user. The registrar then stores the mapping between the public URI of the user and the current location in a local location database or at a remote location server.

In the example shown in FIG. 1, two of the mobile telephony devices 103, 104 are located in one or more target geographic region(s) 106 which is or are served by the telephony network 101. The other mobile telephony device 105 is located in a non-target geographic region but is still served by the telephony network 101.

In some embodiments, an incoming request message comprises a telephony party identifier, which is recognised as the location-related telephony party identifier. The target geographic region 106 is associated with the location-related telephony party identifier.

In some cases, an originating party (from which the incoming request message originates) identifies the target geographic region 106 in the telephony party identifier. For example, the telephony party identifier may be or may comprise a geographic region identifier that identifies the target geographic region(s) 106 and/or enables the target geographic region(s) 106 to be identified from the telephony party identifier.

The geographic region identifier may be a 'user-friendly' description of the target geographic region 106, for example 'HospitalA', 'ShoppingCentreB' or the like. The user-friendly description can then be mapped (for example by means of a lookup table) to one or more target geographic region(s).

The geographic region identifier may comprise geographic coordinates defining the target geographic region(s) 106. For example, an originating party may wish to place a telephone call to any telephony device that happens to be in one or more target geographic region(s) at that time. The originating party may specify a set of geographic coordinates identifying the target geographic region(s) 106 (for example, vertices of one or more polygons defining the target geographic region(s) 106) and include those coordinates in the geographic region identifier.

The telecommunications system 100 may include a location service provider (LSP) 107 which provides location services within the telecommunications system 100. The LSP 107 can be used to determine the geographic location of the mobile telephony devices 103, 104, 105 within the telecommunications system 100. The LSP 107 may be provided as part of the telephony network 101 or may be independent of the telephony network 101. The LSP 107 may interact with the mobile telephony devices 103, 104, 105 to determine their current geographic locations or to assist the mobile telephony devices 103, 104, 105 in determining their own geographic locations.

Location determination may be in response to the occurrence of a particular event within the telecommunications system 100. For example, location determination may be in response to receiving an incoming request message or in response to receiving an outgoing request message from an originating telephony device within the telecommunications system 100.

Location determination may involve tracking the location of one or more of the mobile telephony devices 103, 104, 105 so that their current locations can be determined, estimated or inferred based on their most recent tracked location(s). Different methods of location determination may be preferable in different circumstances, for example depending upon the required accuracy, time for location determination, capabilities of certain entities within the telecommunications system 100 and the like.

There are various mechanisms by means of which the geographic location of the mobile telephony devices 103, 104, 105 can be determined or tracked within the telecommunications system 100.

One mechanism is a network-based determination of the location of a mobile telephony device in which the telephony network 101 determines the location of the mobile telephony device, possibly with the cooperation of the mobile telephony device.

In a GSM (or UMTS) network, a Gateway Mobile Location Centre (GMLC) and a Serving Mobile Location Centre (SMLC) may provide location services within the network.

The GMLC acts as an interface to location-aware and location-based services and clients outside the GSM network that use location information of the mobile telephony devices served by the GSM network. The SMLC can be connected to a Base Station Controller (BSC) in the Base Station Subsystem (BSS) or to a Mobile Switching Centre (MSC) in the Network Switching Subsystem (NSS) in the GSM network. The SMLC receives location request messages from MSCs, performs location calculations for mobile telephony devices that it serves and then returns a location response message to the requesting MSC. The SMLC may cooperate with a Location Measurement Unit (LMU) which may be a dedicated entity within the GSM network or may be incorporated into a Base Transceiver Station (BTS) in the BSS which provides reference information to assist in determining the location of the mobile telephony device.

In GSM networks, the SMLC may receive location estimates or measurements from the mobile telephony device itself using the Radio Resource LoCation Services Protocol (RRLP) by transmitting a Measure Position Request to the mobile telephony device in an RRLP message. The RRLP message may include Assistance Data to assist the mobile telephony device in determining its position. The mobile telephony device replies with a Measure Position Response which may include a location estimate or other location measurement information. The location services provided by the SMLC may be device-assisted in which the mobile telephony device provides raw data to the SMLC which then determines the location of the mobile telephony device. Alternatively, the location determination may be device-based in which the mobile telephony device performs the location calculation itself and transmits the result of the location determination to the SMLC.

One example of such a network-based determination in a GSM network is the Cell Identification (CID) system in which the Cell Identifier (CellID) for the cell in which the mobile telephony device is located is used to determine the approximate location of the mobile telephony device. By identifying the (known) geographic region that is covered by that particular cell, the location of the mobile telephony device can be determined to be within that geographic region. Enhanced Cell Identification (ECID) can provide improved location accuracy calculation using the CellID by evaluating the distance from the mobile telephony device to the BTS in the cell.

Another mechanism by means of which the location of the mobile telephony device can be determined is a device-based determination of the location of the mobile telephony device in which the mobile telephony device plays a more active role in determining its location or determines its own location without any assistance from the network.

One example of a device-based location system is one in which the mobile telephony device includes a Global Positioning System (GPS) receiver that receives signals broadcast by a number of GPS satellites that are in orbit around the earth. The signals include location and timing information from which the mobile telephony device can determine its current location. Differential GPS (DGPS) provides an enhancement to conventional GPS by providing a network of fixed reference stations that calculate the difference between their GPS-calculated location and their actual location and broadcasts the difference to interested devices so that the interested devices can revise their own GPS-based location determinations accordingly. Geolocation signals may be provided by Global Navigation Satellite Systems (GNSSs) other than the GPS.

In some embodiments, a device-based location system may be a hybrid positioning system, such as Assisted GPS (A-GPS), which can provide improved accuracy over a conventional GPS-based location service provider. A-GPS uses geolocation signals from GPS satellites in addition to network-based geolocation services. A-GPS can be useful, for example, inside a building where conventional GPS signals may be attenuated by the walls of the building. The Time To First Fix (TTFF) for GPS-based location, in other words the amount of time taken before the GPS receiver receives the required geolocation signals from the GPS satellites, may be unacceptably long in some situations in which the location of the mobile telephony device should be determined quickly. A High Sensitivity GPS receiver may provide a more acceptable device-based location determination, since it can significantly reduce the TTFF when the geolocation signals from the GPS satellites are strong and may still be used to determine the location of the mobile telephony device in some situations in which standard GPS receivers cannot, for example in some instances if it is located within a building.

In some embodiments, the LSP 107 may comprise a Local Positioning System (LPS) provider by means of which the mobile telephony device can determine its current geographic location.

One example of an LPS provider is a WiFi-based Positioning System (WPS) in which the mobile telephony device identifies and measures the signal strength of nearby wireless access points (such as a nearby wireless router in a building) and uses the LPS provider to estimate its current geographic location.

In some embodiments, the LSP 107 may comprise an Indoor Positioning System (IPS) provider by means of which the mobile telephony device can determine its current geographic location.

The telecommunications system 100 includes a service platform 108 which provides telephony services in accordance with some embodiments. The service platform 108 may include a media gateway controller, call agent or softswitch which may already exist in the telecommunications system 100 and which can be suitably configured to implement the services provided in accordance with some embodiments. For example, the service platform 108 may be responsible for processing incoming request messages and outgoing request messages within the telecommunications system 100.

The service platform 108 may be implemented as a single network entity or, as shown in FIG. 1, may comprise more than one physical and/or logical components, each of which is responsible for one or more aspects of request message processing within the telecommunications system 100. In some embodiments, the service platform 108 comprises service controller 109, location server 110, location database 111, group management server 112, group management database 113, originating TPI selection server 114 and originating TPI database 115 components. The components 109, 110, 111, 112, 113, 114, 115 of the service platform 108 may be implemented in hardware and/or software.

The service controller 109 is generally responsible for handling request message processing, such as call setup request processing, within the telecommunications system 100.

The service controller 109 may intercept or be provided with incoming request messages within the telephony network 101 that comprise telephony party identifiers as described above and determine how those the request message should be processed within the telephony system 100. The service controller 109 may also intercept or be provided with request messages from originating telephony devices so that an originating telephony party identifier may be selected from a plurality of possible telephony party identifiers for an outgoing request message.

There are various mechanisms by means of which the service controller 109 may intercept or be provided with such request messages. For example, one or more triggers may be configured in association with the telephony party identifier and/or a telephony party identifier associated with the originating telephony device. For example, the trigger may be an Intelligent Network (IN) trigger, an Advanced Intelligent Network (AIN) trigger, a Wireless Intelligent Network (WIN) trigger, a Customised Applications for Mobile networks Enhanced Logic (CAMEL) trigger, an Intelligent Network Application Part (INAP), or a Local Number Portability (LNP) trigger. In an IP Multimedia Subsystem (IMS) environment, this may involve configuring a telephone switch with Filter Criteria such as initial Filter Criteria (iFC).

The location server 110 cooperates with a location database 111 that contains current location information for the mobile telephony devices 103, 104, 105 and/or the users of the mobile telephony devices 103, 104, 105. The location server 110 may communicate directly with the LSP 107 and/or the mobile telephony devices 103, 104, 105 to determine the current location of the mobile telephony devices 103, 104, 105. For example, the location server 110 may transmit periodic or ad hoc location update requests to the LSP 107 to determine the current location of the mobile telephony devices 103, 104, 105. Alternatively or additionally, the location server 110 may receive ad hoc location updates from the LSP 107 upon the occurrence of a location-related event, for example if the LSP 107 tracks the location of a particular mobile telephony device and detects that it has just entered or left the target geographic region(s) 106.

The group management server 112 cooperates with a group management database 113 which contains information relating to telephony party identifiers, group identifying data, mobile telephony party identifiers, UIDs and the like. The group management server 112 is responsible for managing and accessing group identifying data which includes a group of telephony party identifiers representing mobile telephony devices that are potential recipient telephony devices, and for managing and accessing subgroup identifying data which includes a subgroup of telephony party identifiers, selected from the group, that are recipient devices currently located in the one or more target geographic region(s) 106.

The originating telephony party identifier (TPI) selection server 114 cooperates with an originating TPI database 115. In some embodiments, a plurality of possible originating telephony party identifiers are associated with a particular mobile telephony device 103, 104, 105 and/or the user associated with that particular mobile telephony device 103, 104, 105, a record of which association is stored in the originating TPI database 115. The originating TPI selection server 114 selects an originating telephony party identifier for request messages originating from the mobile telephony devices 103, 104, 105 from the plurality of possible originating telephony party identifiers, for example based on the geographic location of the originating mobile telephony device 103, 104, 105 from which it receives the request message. The originating TPI selection server 114 informs the service controller 109 of the selected originating telephony party identifier so that an outgoing request message can be forwarded to a terminating telephony device using the selected originating telephony party identifier.

In some embodiments, the service controller 109 may receive an incoming request message originating from a telephony device in the group of potential recipient telephony devices, and replace an originating telephony party identifier in the received incoming request message with a telephony party identifier, which is recognised as a location-related telephony party identifier, as an originating telephony party identifier in an outgoing request message when the telephony device is located in the target geographic region(s). An outgoing request message can then be transmitted which includes the location-related telephony party identifier as the originating telephony party identifier.

Figure 2:
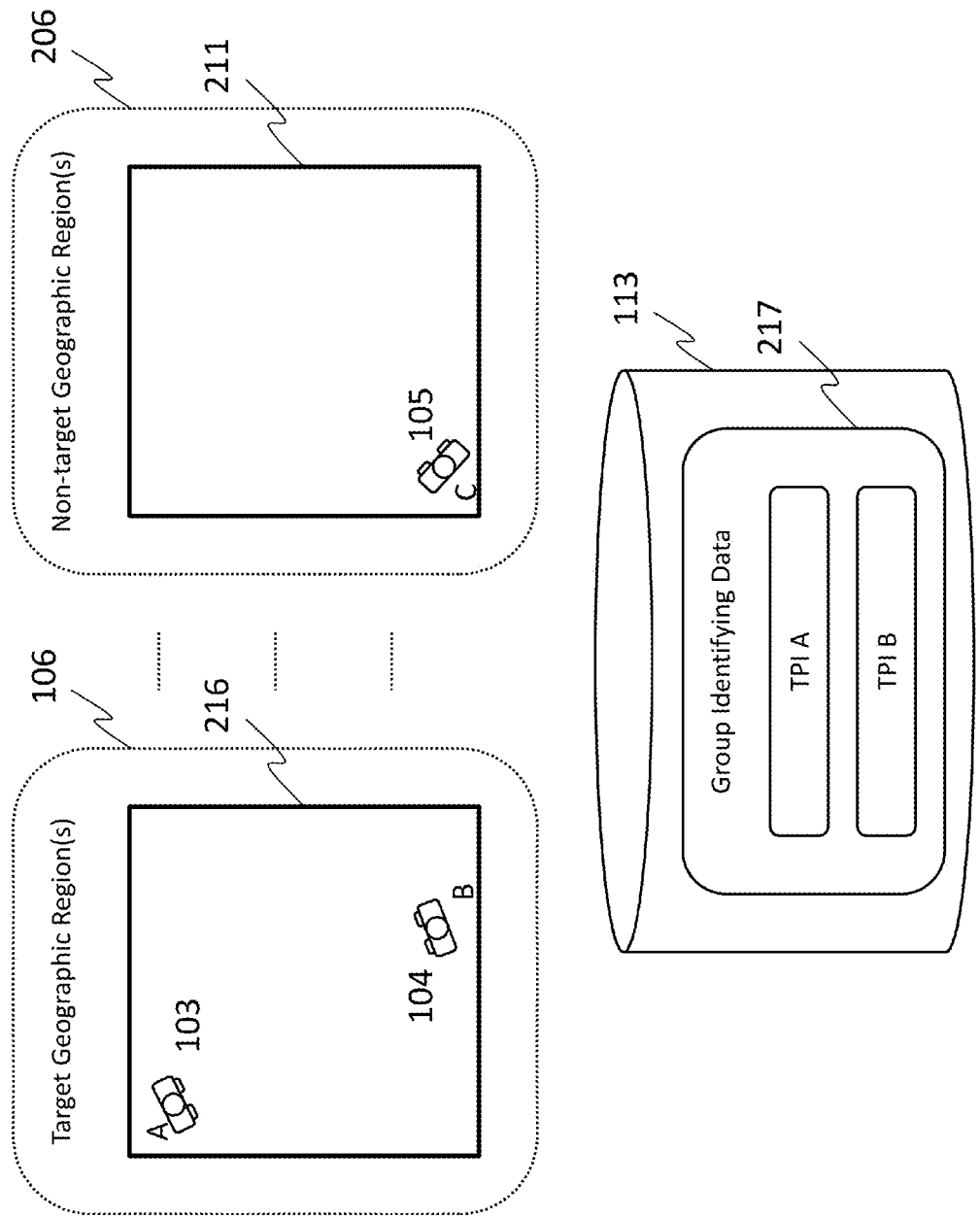
FIG. 2 is a schematic representation of a target geographic region according to preferred embodiments.

FIG. 2 is a schematic representation of an example in which two of the mobile telephony devices 103, 104 are currently located in one or more target geographic region(s) 106 and another of the mobile telephony devices 105 is located in a non-target geographic region which is in one or more non-target geographic region(s) 206.

User A who is represented by user identifier 'UID A' is associated with mobile telephony device 103, user B who is represented by user identifier 'UID B' is associated with mobile telephony device 104 and user C who is represented by user identifier 'UID C' is associated with mobile telephony device 105. Mobile user device 103 is represented by mobile telephony party identifier 'MTPI A', mobile user device 104 is represented by mobile telephony party identifier 'MTPI B' and mobile user device 105 is represented by mobile telephony party identifier 'MTPI C'.

In some situations, a calling or originating party may wish to contact any of the users A, B, C provided that they are currently located in one or more target geographic region(s). For example, the users A, B, C may make up the marketing department of an enterprise and can be situated in any of the enterprise's offices at any given time. In the example described below, the calling party wishes to call any of the users A, B, C that happen to be located in the region 106 of a particular office location of the enterprise. The calling party does not wish to call any of the users A, B, C that are not currently located in the region 106 of the particular office location.

User A and B are currently located in region 106, whereas user C is currently located in another region forming part of the non-target geographic region(s) 206. For example, the user C may be located in a different office location 211 that is also associated with the enterprise.

Group identifying data 217 in the group management database 113 includes a group of mobile telephony party identifiers, MTPI A and MTPI B, representing the mobile telephony devices 103, 104 that are currently located in region 106.

In some embodiments, the group identifying data 217 identifies only those mobile telephony devices 103, 104 that are currently located in the target geographic region(s) 106 (the group identifying data includes only MTPI A and MTPI B). In other embodiments, the group identifying data 217 may identify all of the mobile telephony devices 103, 104, 105 that are associated with users A, B, C and may include respective flags to indicate whether or not the individual mobile telephony devices 103, 104, 105 are currently located in the target geographic region(s) 106.

Figure 3:
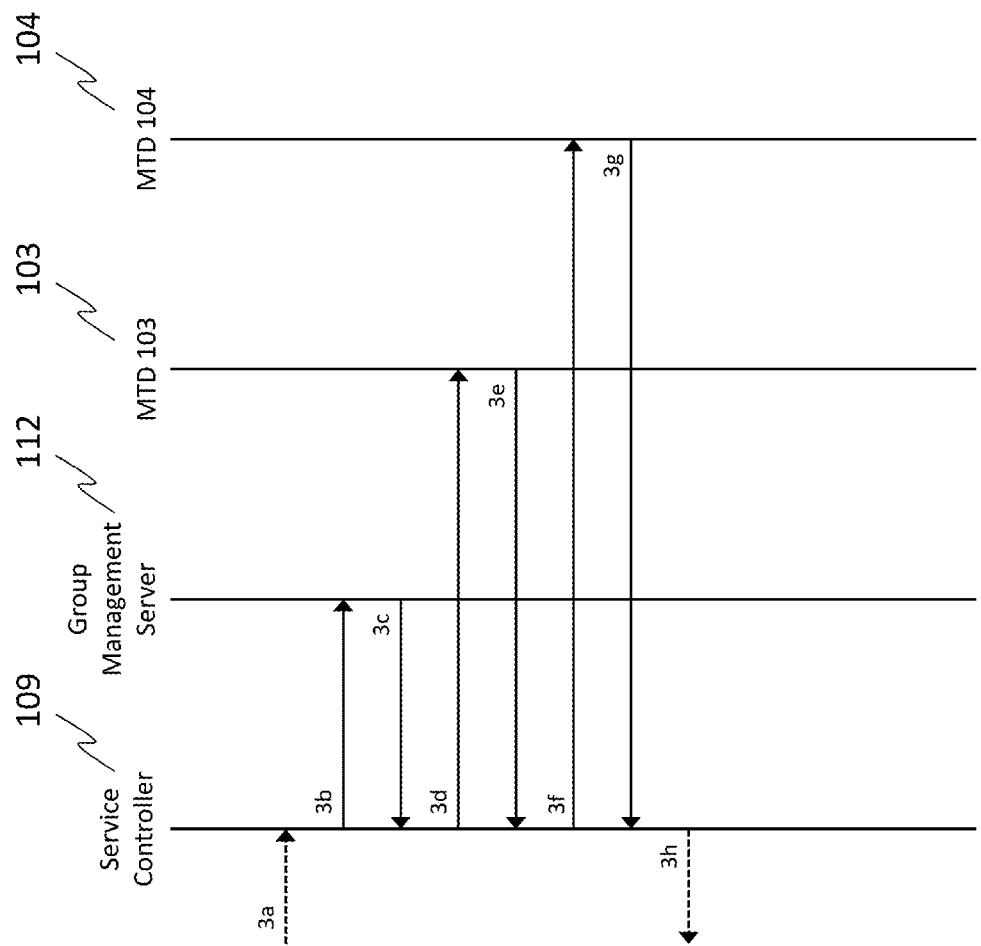
FIG. 3 is a sequence diagram showing a method of processing an incoming request message according to preferred embodiments.

FIG. 3 is a sequence diagram showing a method of processing an incoming request message in the form of a call setup request in accordance with some embodiments. A calling party wishes to call any of the users A, B, C that is or are currently located in the target geographic region 106. The calling party initiates a telephone call to a special telephone dialing number for this purpose which, in this example, is a telephony party identifier. A trigger configured within the telephony network 101 passes the call connection request to the service controller 109.

At step 3a, the service controller 109 receives the incoming call setup request and identifies the telephony party identifier in the incoming call setup request. The service controller 109 recognises the telephony party identifier as a location-related telephony party identifier.

At step 3b, the service controller 109 provides the location-related telephony party identifier to the group management server 112. The group management server 112 queries the group management database 113 using the location-related telephony party identifier to determine the recipient mobile telephony devices for the call. The group management server 112 accesses the group identifying data 217, associated with the received location-related telephony party identifier, which includes a subgroup of telephony party identifiers; in this instance MTPI A and MTPI B and not MTPI C because mobile telephony device 105 is not currently located in the target geographic region 106. In some embodiments, MTPI A, MTPI B and MTPI C may have been pre-registered against the location-related telephony party identifier. In other embodiments, MTPI A, MTPI B and MTPI C are not pre-registered against the location-related telephony party identifier and the calling party who calls the telephony party identifier may not even be aware in advance of the mobile telephony party identifiers of the mobile telephony devices 103, 104, 105.

At step 3c, the group management server 112 returns the mobile telephony party identifiers MTPI A and MTPI B to the service controller 109.

At step 3d, the service controller 109 transmits an outgoing request message in the form of a call setup request which may be in the form of an Integrated Services Digital Network User Part (ISUP) Initial Address Message (IAM) to MTPI A which represents mobile telephony device 103. This causes the mobile telephony device 103 to ring. The telephone service provider 109 receives a response in the form of an appropriate message, such as an ISUP Address Complete Message (ACM) from the mobile telephony device 103 at step 3e to indicate that the mobile telephony device 103 is ringing.

At step 3f, the service controller 109 transmits an outgoing request message in the form of a call setup request to MTPI B which represents mobile telephony device 104. This may cause the mobile telephony device 104 to ring. The telephone service provider 109 receives an appropriate response message from the mobile telephony device 104 at step 3g to indicate that the mobile telephony device 104 is ringing.

At step 3h, the service controller 109 transmits an appropriate message to the originating telephony device of the calling party, for example a message to inform its user that the called party's telephone(s) (in this case the mobile telephony devices 103, 104) is or are ringing. On pickup by the called party, a telephony session can then be established between the called and calling parties in the conventional manner (not shown).

Figure 4:
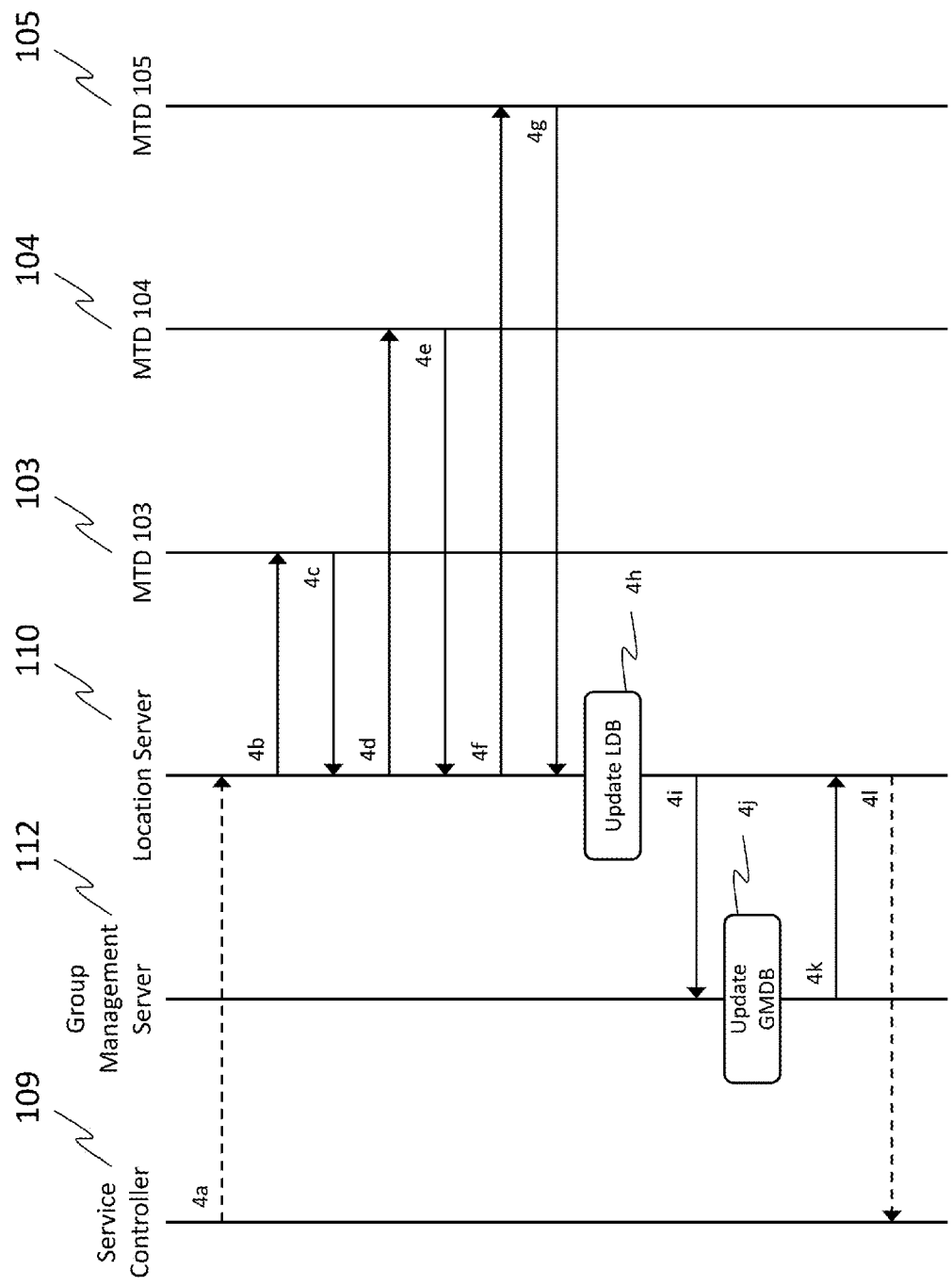
FIG. 4 is a sequence diagram showing a method of determining the location of mobile telephony devices according to preferred embodiments.

FIG. 4 is a sequence diagram showing a method of determining the location of the mobile telephony devices 103, 104, 105, updating corresponding location records in the location database 111 and updating group identifying data in a group management database 113. In this example, the locations of the mobile telephony devices 103, 104, 105 are determined prior to receiving an incoming call setup request, which can reduce the processing time for routing the message to the relevant mobile telephony device(s) after it has been received since their location(s) is or are already known.

At step 4a, the service controller 109 optionally transmits a location update request to the location server 110. The transmission of the location update request at step 4a is optional in the sense that the location server 110 may, instead, be configured to determine the locations of the mobile telephony devices 103, 104, 105 periodically without having to receive a location update request message from the service controller 109.

At step 4b, the location server 110 transmits a location update request message to mobile telephony device 103. The location server 110 may, for example, transmit the location update request directly to the mobile telephony device 103 via the telephony network 101 or may instruct the LSP 107 to transmit a location update request to mobile telephony device 103.

The mobile telephony device 103 sends a location update response message to the location server 110 at step 4c, possibly via the LSP 107. The location update response message of step 4c includes location information identifying the location of the mobile telephony device 103 or enabling the location server 110 or the LSP 107 to determine the location of the mobile telephony device 103.

Similarly to steps 4b and 4c, the location server 110 transmits a location update request message to mobile telephony device 104 at step 4d, possibly via the LSP 107, and receives a location update response message from mobile telephony device 104 at step 4e, possibly via LSP 107, the location update response message comprising location information identifying the location of the mobile telephony device 104 or information enabling the location server 110 or the LSP 107 to determine the location of the mobile telephony device 104.

Similarly to steps 4b and 4c and step 4d and 4e, the location server 110 transmits a location update request message to mobile telephony device 105 at step 4f, possibly via the LSP 107, and receives a location update response message from mobile telephony device 105 at step 4g, possibly via the LSP 107, the location update response message comprising location information identifying the location of the mobile telephony device 105 or information enabling the location server 110 or the LSP 107 to determine the location of the mobile telephony device 105.

At step 4h, the location server 110 updates location records in the location database 111 for each of the mobile telephony devices 103, 104, 105 that provided location update information to the location server 110 at steps 4c, 4e, 4g respectively. The location database 111, thus, contains up-to-date location information for each of the mobile telephony devices 103, 104, 105.

At step 4i, the location server 110 provides the location update information to the group management server 112.

In some embodiments, mobile telephony devices may become eligible to receive request messages addressed to a particular telephony party identifier that is recognised as a location-related telephony party identifier as soon as they are located in one or more target geographic region(s) associated with that location-related telephony party identifier. In such embodiments, a mobile telephony party identifier representing a newly eligible mobile telephony device (that has just entered the geographic region(s)) may be added to group identifying data for the group of mobile telephony devices currently within the target geographic region(s) as soon as it enters the target geographic region(s). As such, the group management server 112 may update group identifying data in the group management database 113 at step 4j accordingly.

At step 4k, the group management server 112 acknowledges receipt and processing of the location update information to the location server 110. At step 4l, if the service controller 109 initiated the location update procedure at step 4a, the location server 110 acknowledges receipt and processing of the initial location update request to the service controller 109 at step 4l.

The processing of FIG. 4, thus, determines the current location of the mobile telephony devices 103, 104, 105 prior to receipt of an incoming call setup request so that the service controller 109 can handle the incoming request message promptly upon its receipt without having to determine the location of the mobile telephony device(s) after receiving the call setup request.

In some embodiments, potential recipient devices are not registered as a group against a location-related telephony party identifier, for example if that location-related telephony party identifier comprises a geographic region identifier and is intended for a subgroup of mobile telephony devices currently located in target geographic region(s) associated with the location-related telephony party identifier. In such embodiments, the group of potential recipient devices may include all devices in the system 100.

Figure 5:
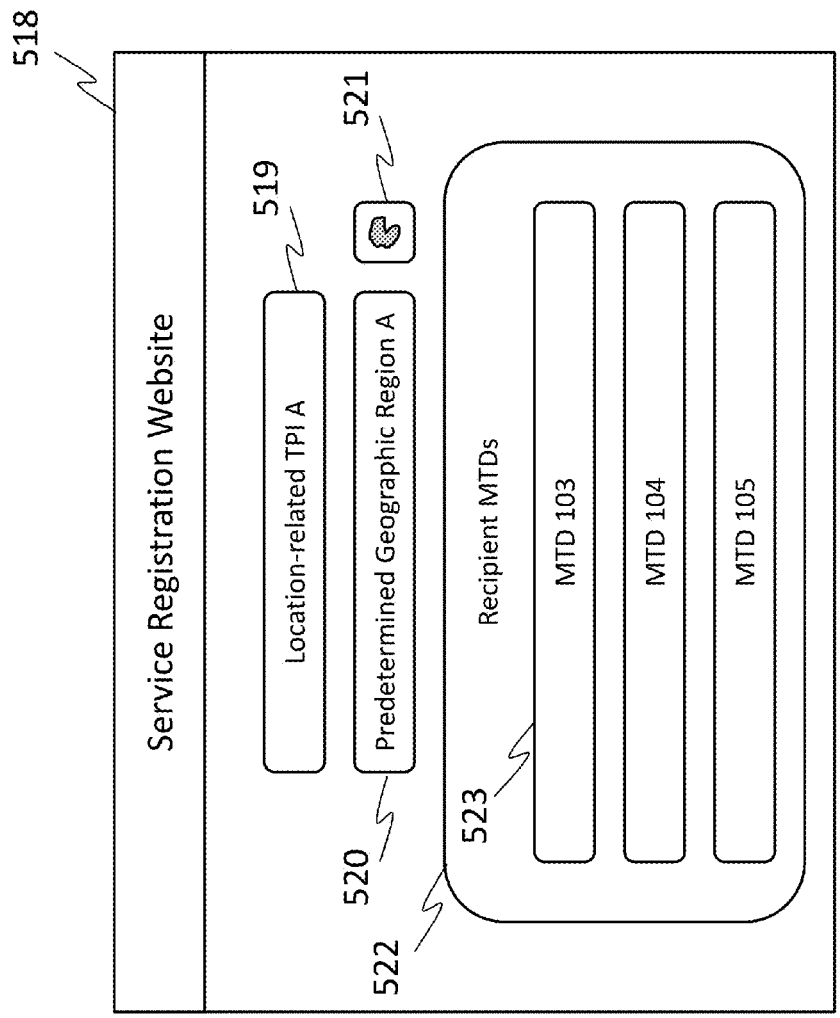
FIG. 5 is a page schematic of a service registration website for registration to a service provided according to preferred embodiments.

FIG. 5 is a schematic of a service registration website 518 for registration to a service provided according to some embodiments. Although shown as a single webpage, it should be understood that the service registration process could involve a number of different web pages. A subscriber to the service registers a group of mobile telephony devices 103, 104, 105 against a location-related telephony party identifier (in this instance location-related TPI A') and specifies one or more target geographic regions(s) in which the mobile telephony devices 103, 104, 105 are to be located to receive incoming request messages (such as call setup requests) addressed to location-related TPI A.

The service registration website 518 includes a location-related telephony party identifier field 519 in which a subscriber can input and/or be presented with a location-related telephony party identifier for the service.

The location-related telephony party identifier may be in the form of an existing telephone dialing number representing a telephony device belonging to the subscriber. For example, the location-related telephony party identifier may be a home telephone dialing number.

The location-related telephony party identifier may, instead, be created for the purposes of subscribing to the service provided in accordance with some embodiments.

The service registration website 518 also includes a target geographic region field 520 in which a subscriber can input and/or be presented with one or more geographic region(s) to be associated with the location-related telephony party identifier. A map button 521 may be built into the service registration website 518 which the subscriber may select to load a mapping application that can assist in defining the target geographic region(s). The subscriber may be able to interact with the mapping application to select or identify geographic coordinates of vertices of a polygon defining the target geographic region(s). The coordinates can then be incorporated into the location-related telephony party identifier, for example by means of mapping a user-friendly description for the selected target geographic region(s) to the associated coordinates.

The service registration website 518 also includes a recipient mobile telephony device field 522 in which a subscriber can input and/or be presented with mobile telephony party identifiers to be registered against the location-related telephony party identifier. The subscriber may manually input the mobile telephony party identifiers in appropriate sub-fields 523 within the mobile telephony device field 522 if they are already known to the user. Alternatively or additionally, the subscriber may be presented with a set of mobile telephony party identifiers representing mobile telephony devices currently located in the target geographic region(s) from which the subscriber can identify one or more mobile telephony devices to be registered against the location-related telephony party identifier.

In some embodiments, identifying one or more mobile telephony devices to be registered against the location-related telephony party identifier results in an authorization message being transmitted to each of the mobile telephony devices, as will be explained in detail below, so that the mobile telephony device (and/or its user) may authorize registration against the location-related telephony party identifier.

In some embodiments, a mobile telephony device may require prior authorization from its user to be discoverable in such situations so that the location of the mobile telephony device is only determinable and/or inferable if its user authorizes such discovery.

Figure 6A:
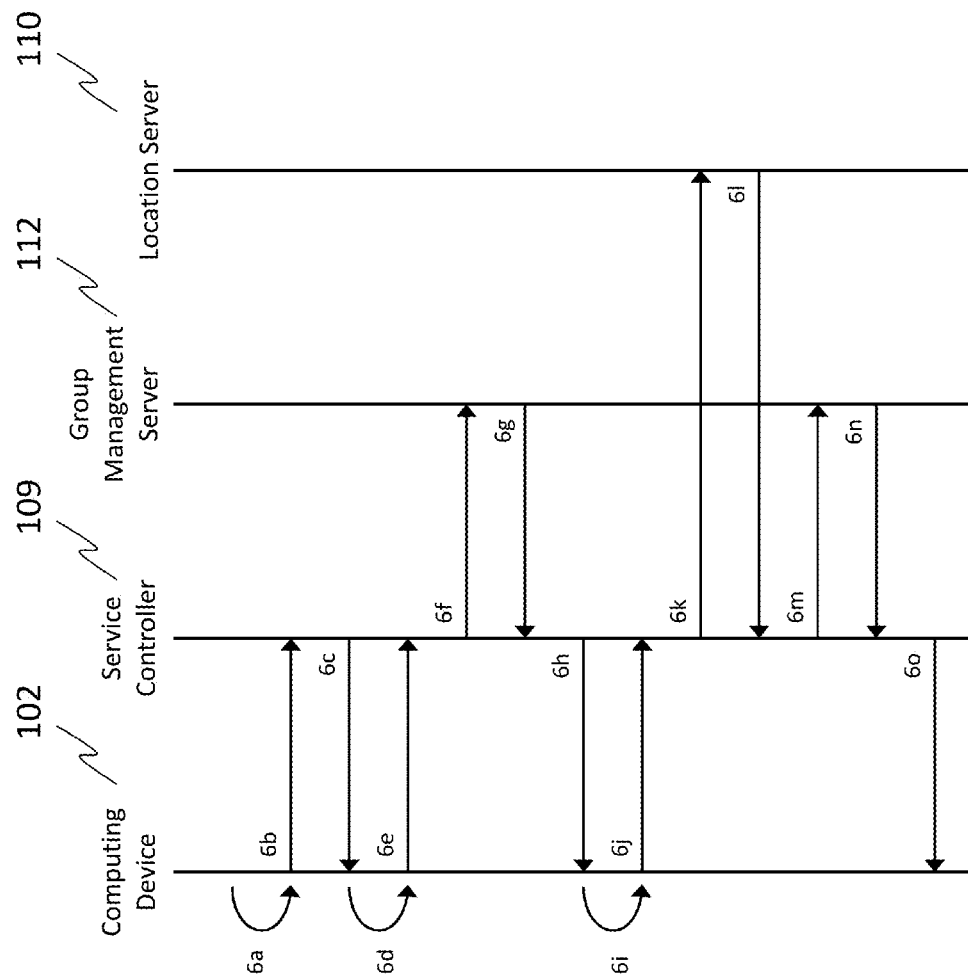
FIGS. 6A and 6B are a sequence diagram showing registration of a location-related telephony party identifier according to preferred embodiments.
Figure 6B:
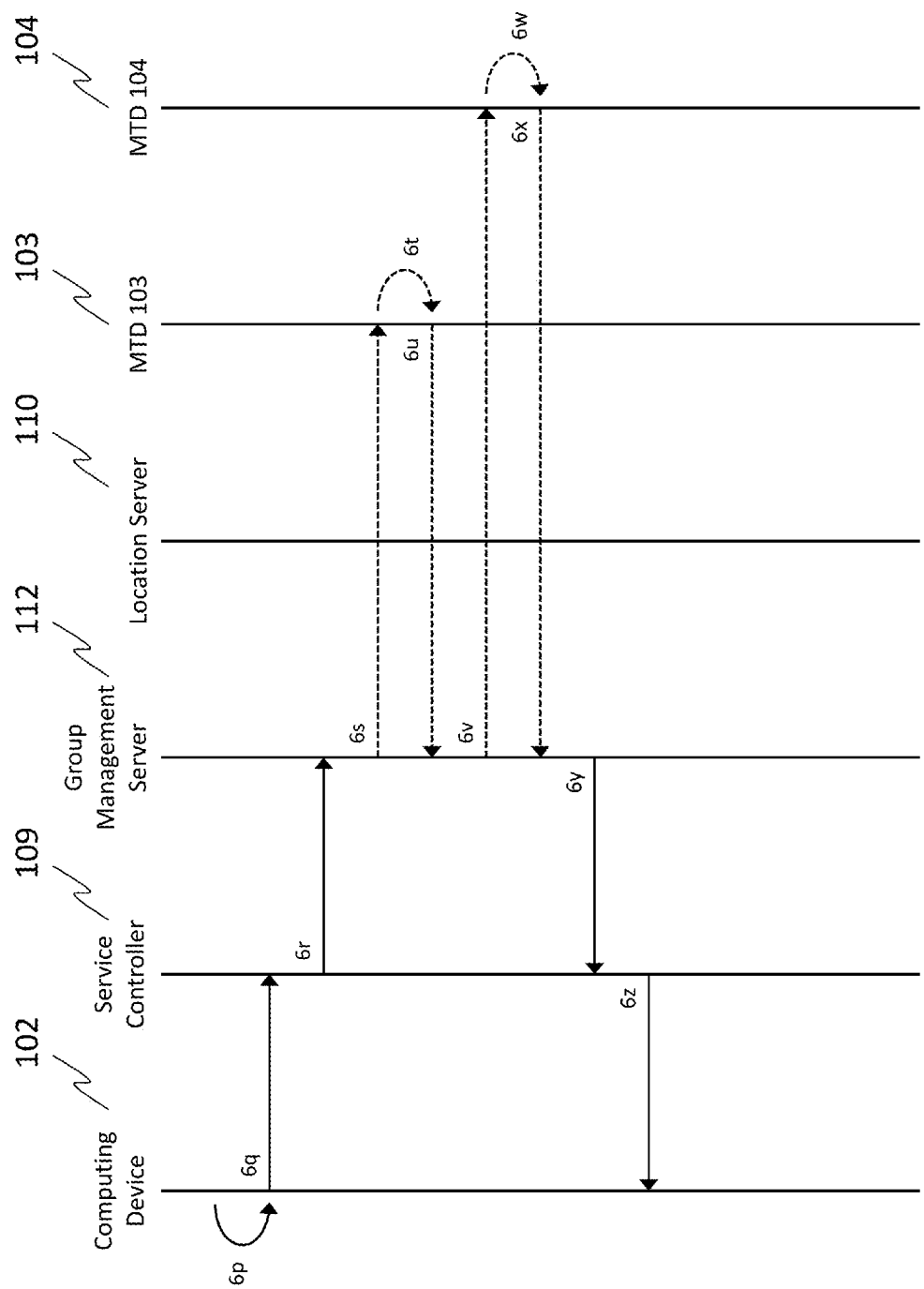

FIGS. 6A and 6B are a sequence diagram showing registration of a location-related telephony party identifier using a service registration website 518 such as that described above with reference to FIG. 5.

At step 6a, a subscriber initiates access to the service registration webpage 518 via a browser application on their computing device 102, for example by entering a Uniform Resource Locator (URL) for the service registration webpage 518 into the address bar of their browser.

At steps 6b and 6c, the computing device 102 requests and retrieves the service registration webpage 518 from the service controller 109 (which, in this example, hosts the website) via the telephony network 101. The service registration webpage 518 is then displayed to the subscriber via a display device (not shown) associated with the computing device 102.

At step 6d, the subscriber enters a desired location-related telephony party identifier into the telephony party identifier field 519 of the service registration page 518. The computing device 102 transmits the desired location-related telephony party identifier entered at step 6d to the service controller 109 at step 6e. The service controller 109 then forwards the desired location-related telephony party identifier to the group management server 112 at step 6f.

The group management server 112 queries the group management database 113 to determine whether the desired location-related telephony party identifier is available for registration. At step 6g, the group management server 112 transmits a location-related telephony party identifier registration response message to the service controller 109, indicating whether or not the desired location-related telephony party identifier is available for registration. If the desired location-related telephony party identifier is not available for registration, the group management server 112 may include one or more alternative location-related telephony party identifiers that are available for registration. The service controller 109 forwards the location-related telephony party identifier registration response message to the computing device 102 at step 6h. The computing device 102 then displays the result of the location-related telephony party identifier registration request (registration acceptance, registration decline, proposal for an alternative location-related telephony party identifier) to the subscriber. Steps 6d to 6h may be repeated, for example if the subscriber is presented with alternative possible location-related telephony party identifiers and is prompted to select one of them for the purposes of registration.

At step 6i, the subscriber specifies one or more target geographic region(s) to be associated with the location-related telephony party identifier by an appropriate input into the webpage. For example, the subscriber may simply input an alphanumeric string that can be recognised as representing the one or more geographic region(s). The subscriber may, instead, specify geographic coordinates defining the one or more geographic region(s), for example by using an interactive map.

In some embodiments, the subscriber may be presented with a list of possible geographic regions that can be set as the one or more target geographic region(s) to be associated with the location-related telephony party identifier from which the subscriber may select one or more appropriate geographic region(s).

At step 6j, the computing device 102 transmits an appropriate message to the service controller 109 to identify the one or more target geographic region(s) specified by the subscriber.

At step 6k, the service controller 109 optionally transmits a geographic region association request message to the location server 110 so that the location server 110 can identify all of the mobile telephony devices that are currently located in the one or more target geographic region(s). The location server 110 may identify the mobile telephony devices by retrieving current location information in the location database 111, by cooperating with the LSP 107 or by paging one or more mobile telephony device(s) that it believes to be in or near one or more target geographical region(s) (for example as indicated by legacy location information in the location database 111) to determine their current location.

At step 6l, if the service controller 109 transmitted the optional geographic region association request message of step 6k, the location server 110 responds to the service controller 109 with a location update response message identifying the mobile telephony party identifiers representing one or more mobile telephony device(s) that is or are currently located in the one or more target geographic region(s).

At step 6m, the service controller 109 transmits a geographic region association request message to the group management server 112 so that the group management server 112 can associate the desired target one or more geographic region(s) with the location-related telephony party identifier in a record for the location-related telephony party identifier in the group management database 113. At step 6n, the group management server 112 responds with a message acknowledging that the association has been recorded in the group management database 113. The service controller 109 transmits an acknowledgement message to the computing device 102 at step 6o, which may be displayed to the subscriber on a display device associated with the computing device 102. If the optional steps 6k and 6l were carried out, then a list of mobile telephony party identifiers representing one or more mobile telephony device(s) that is or are currently located in the one or more target geographic region(s) may also be displayed to the subscriber in the recipient mobile telephony device field 522.

At step 6p, the subscriber identifies or inputs one or more mobile telephony party identifier(s) representing one or more mobile telephony device(s) to be registered against the location-related telephony party identifier into the service registration webpage 518. Such input may involve manually inputting the one or more mobile telephony party identifier(s) of some or all of the one or more mobile telephony device(s) to be registered or selecting desired ones of the list of one or more mobile telephony device(s) in the one or more target geographic region(s) from the list of such devices. The computing device 102 transmits details of the one or more mobile telephony device(s) to the service controller 109 at step 6q. The service controller 109 then transmits a location-related telephony party identifier registration request message to the group management server 112 at step 6r, which enables the group management server 112 to identify the one or more mobile telephony device(s) that the subscriber wishes to register against the location-related telephony party identifier.

At step 6s, the group management server 112 optionally transmits a group membership authorization request message to mobile telephony device 103, via the telephony network 101, to request authorization to register the mobile telephony party identifier representing mobile telephony device 103 against the location-related telephony party identifier. The mobile telephony device 103 may prompt its user, at step 6t, to authorize the registration against the location-related telephony party identifier. At step 6u, the mobile telephony device 103 responds to the group management server 112 with a group membership authorization response message indicating whether or not registration against the location-related telephony party identifier was authorized by the mobile telephony device 103 and/or its user. The group management server 112 updates a record for the location-related telephony party identifier in the group management database 113 accordingly.

Steps 6v, 6w and 6x are similar to steps 6s, 6t and 6u respectively, but involve the group management server 112 and mobile telephony device 104 rather than mobile telephony device 103.

At step 6y, the group management server 112 acknowledges receipt and processing of the one or more mobile telephony party identifier(s) it received from the service controller 109 at step 6r and, optionally, identifies which of the one or more desired mobile telephony device(s) positively authorized registration against the location-related telephony party identifier. The service controller 109 transmits an appropriate acknowledgement message to the computing device 102 at step 6z, which may be displayed to the subscriber using a display device associated with the computing device 102.

Figure 7A:
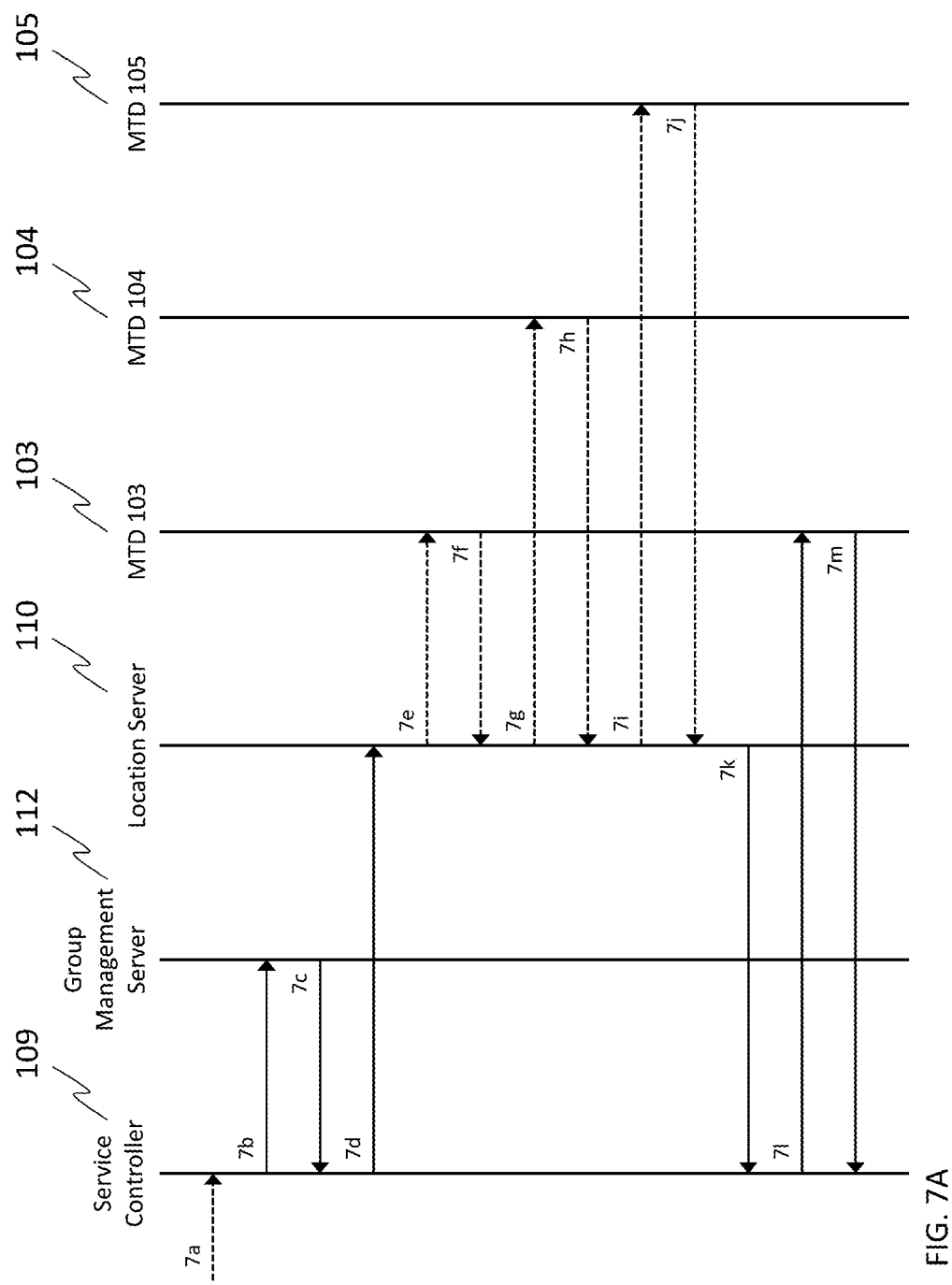

FIGS. 7A and 7B are a sequence diagram showing a method of processing an incoming request message in the form of an incoming call setup request in accordance with some embodiments. In this example, the incoming call setup request comprises a location-related telephony party identifier against which three mobile telephony devices 103, 104, 105 are registered. Of those registered mobile telephony devices 103, 104, 105, only two of the mobile telephony devices 103, 104 are currently located in the one or more target geographic region(s) 106 associated with the location-related telephony party identifier; the other mobile telephony device 105 is currently located in a non-target geographic region which is in one or more non-target geographic regions.

At step 7a, the service controller 109 receives an incoming call setup request message which is addressed to the location-related telephony party identifier.

At step 7b, the service controller 109 transmits the location-related telephony party identifier to the group management server 112. The group management server 112 queries the group management database 113 using the location-related telephony party identifier and retrieves the mobile telephony party identifiers representing the three mobile telephony devices 103, 104, 105 that are registered against the location-related telephony party identifier to which the incoming call setup request message was addressed. The group management server 112 provides the retrieved mobile telephony party identifiers representing mobile telephony devices 103, 104, 105 to the service controller 109 at step 7c. The group management server 112 also determines the one or more target geographic region(s) associated with the location-related telephony party identifier and identifies the one or more target geographic region(s) in the transmission of step 7c to the service controller 109.

At step 7d, the service controller 109 transmits a location request message to the location server 110, identifying the mobile telephony devices 103, 104, 105 whose locations are to be determined.

The location server 110 may already be aware of the location of some or all of the mobile telephony devices 103, 104, 105 identified in the location request message it received at step 7d by accessing the location database 111. If the location server 110 is not already aware of the location one or more of the mobile telephony devices 103, 104, 105, it may transmit one or more location update request message(s) to the one or more of the mobile telephony devices 103, 104, 105 whose location(s) is or are unknown, at steps 7e, 7g, 7i respectively, and receives one or more location update response message (s) from the one or more mobile telephony device(s) 103, 104, 105 at steps 7f, 7h, 7j respectively, possibly via the LSP 107. It will be appreciated that the location server 110 may transmit fewer location update request messages to (and, accordingly, receive fewer location update response messages from) the mobile telephony devices 103, 104, 105 if it is already aware of some of their locations.

At step 7k, the location server 110 transmits a location response message to the service controller 109 comprising location information for the mobile telephony devices 103, 104, 105 identified in the location request message it received from the location server 110 at step 7d.

The service controller 109 then compares the location of the mobile telephony devices 103, 104, 105 with the one or more target geographic region(s) to determine which (if any) of the mobile telephony devices 103, 104, 105 is or are currently located in the one or more target geographic region(s) associated with the location-related telephony party identifier. In this example, it is determined that mobile devices 103 and 104 are currently located in the one or more target geographic region(s) associated with the location-related telephony party identifier and that the other mobile device 105 is not currently located in the one or more target geographic region(s) associated with the location-related telephony party identifier.

At steps 7l and 7n, the service controller 109 transmits outgoing request messages in the form of call setup request messages to the two mobile telephony devices 103 and 104 respectively that are determined to be currently located in the one or more target geographic region(s) associated with the location-related telephony party identifier. At steps 7m and 7o, the service controller 109 receives acknowledgements from both of the two mobile telephony devices 103 and 104 respectively.

At step 7p, the service controller 109 acknowledges that it has completed the processing of the incoming call setup request message.

Figure 8:
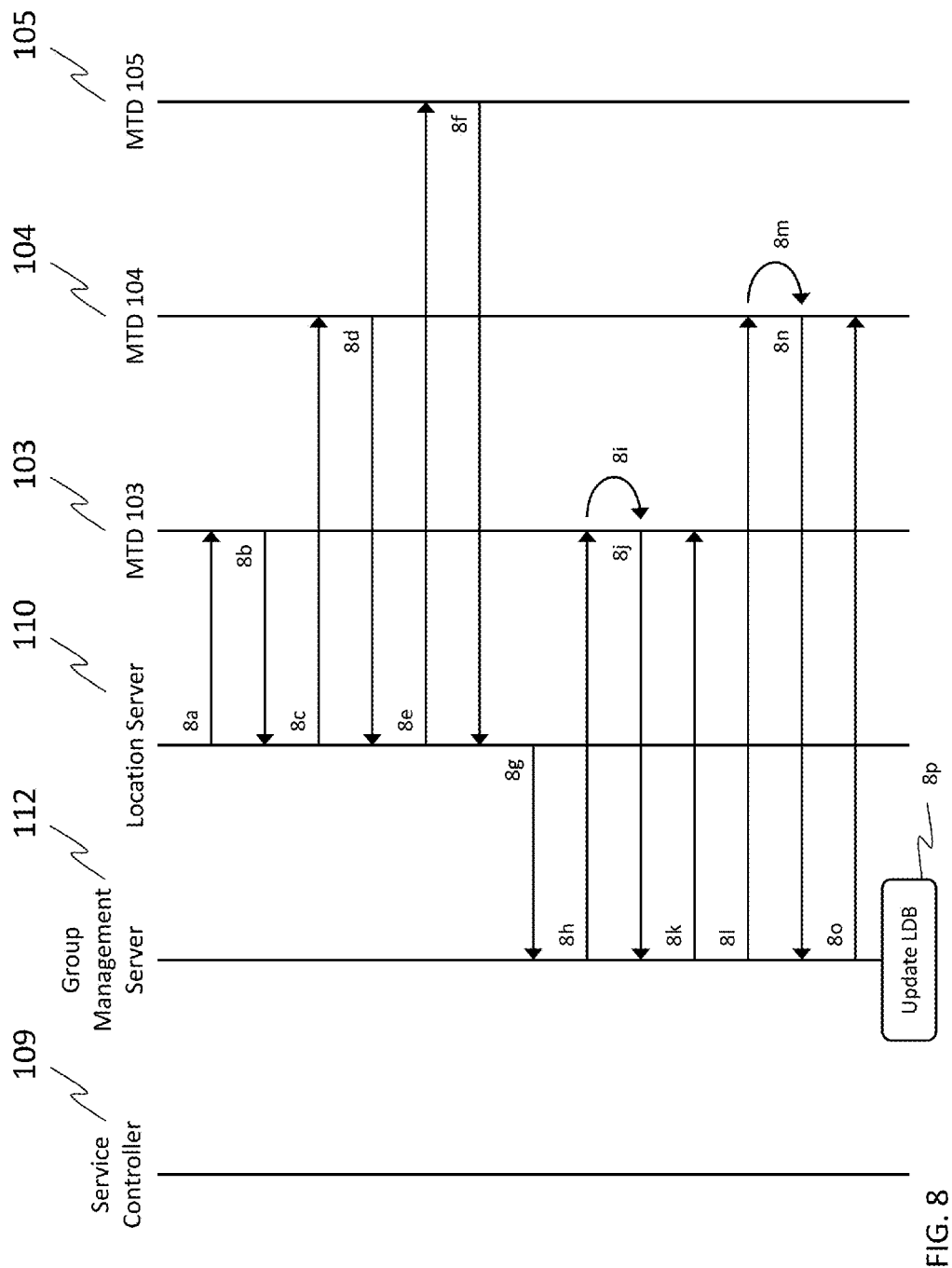
FIG. 8 is a sequence diagram showing a method of inviting a mobile telephony device to register against a location-related telephony party identifier according to preferred embodiments.

FIG. 8 is a sequence diagram showing a method of inviting mobile telephony devices to register against a location-related telephony party identifier after determining that they are currently located in one or more target geographic region(s) associated with the location-related telephony party identifier.

Prior to step 8a, the location server 110 determines that it is to perform a location update to identify one or more mobile telephony device(s) currently located in the one or more target geographic region(s) associated with the location-related telephony party identifier. The determination may be as a result of receiving an appropriate request from the service controller 109 and/or the group management server 112. Alternatively or additionally, the determination may be an inference as a result of a time having elapsed since it last performed a location update in relation to the one or more target geographic region(s).

At steps 8a, 8c and 8e, the location server 110 transmits location update request messages to each of mobile telephony devices 103, 104, 105 respectively. At steps 8b, 8d and 8f, the location server receives location update response messages from each of mobile telephony devices 103, 104, 105 respectively. The location update request and response messages may be transmitted and received via the LSP 107 and, in some cases, the LSP 107 may be able to determine the location of some or all of the mobile telephony devices 103, 104, 105 without having to transmit location request messages to them.

At step 8g, the location server 110 may transmit a location update message to the group management server 112. The location update message of step 8g may be transmitted if the location of one or more of the mobile telephony devices 103, 104, 105 has changed from their previously reported locations.

In this example, the group management server 112 determines that mobile telephony devices 103 and 104 are currently located in the one or more target geographic region(s) associated with the location-related telephony party identifier and are eligible to register against the location-related telephony party identifier.

At steps 8h and 8l, the group management server 112 transmits invitation messages to each of mobile telephony devices 103 and 104 respectively. In this example, it does not transmit an invitation message to mobile telephony device 105 because mobile telephony device 105 is not currently located in the one or more target geographic region(s). At steps 8i and 8m, the mobile telephony devices 103 and 104 and/or their respective users authorize the invitation request. At steps 8j and 8n, mobile telephony devices 103 and 104 transmit respective invitation response messages to the group management server 112. The group management server 112 transmits respective acknowledgement messages to mobile telephony devices 103 and 104 at steps 8k and 8o respectively, which may be displayed to the respective users A, B of the mobile telephony devices 103 and 104. At step 8p, the group management server 112 updates a record for the location-related telephony party identifier in the group management database 113 accordingly.

Figure 9:
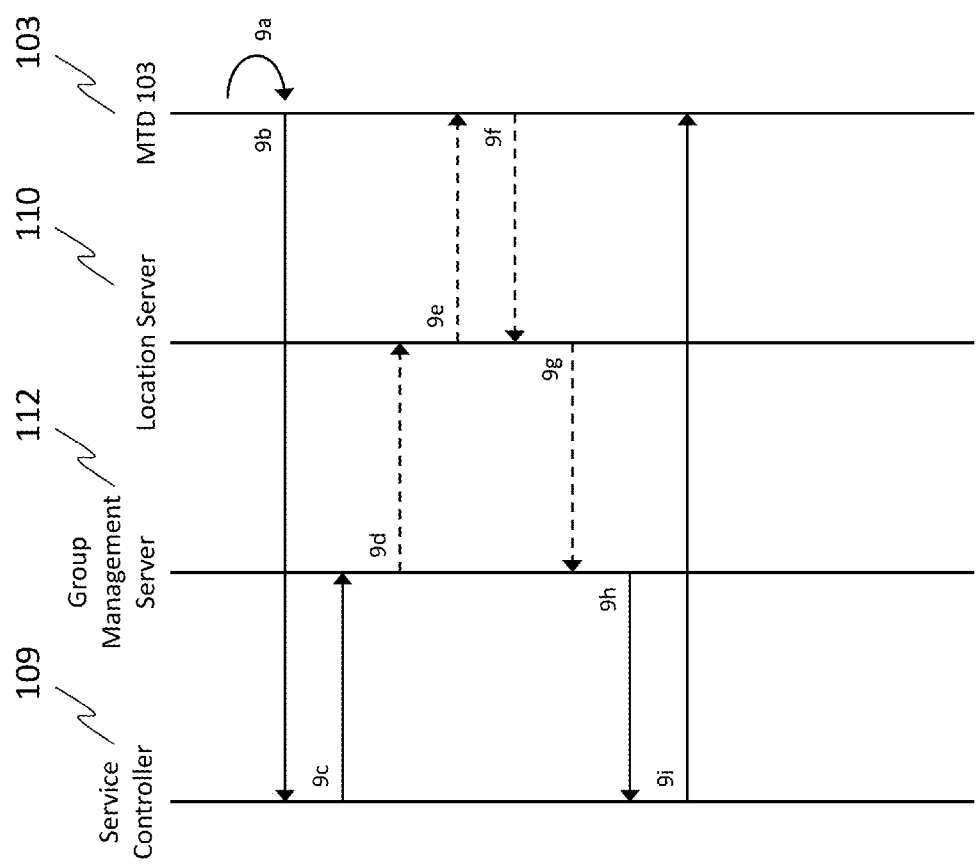
FIG. 9 is a sequence diagram showing a method of processing a membership request from a mobile telephony device according to preferred embodiments.

FIG. 9 is a sequence diagram showing a method of processing a membership request from a mobile telephony device 103 that wishes (or whose user wishes) to register a mobile telephony party identifier representing the mobile telephony device 103 against a particular location-related telephony party identifier in accordance with some embodiments.

At step 9a, a user of mobile telephony device 103 interacts with the mobile telephony device 103 to initiate registration against a particular location-related telephony party identifier. In some cases, this step is optional in that the mobile telephony device 103 might not require input from the user to determine that the user wishes to register against the location-related telephony party identifier or may be configured to transmit membership request messages whenever the mobile telephony device 103 enters a geographic region that is associated with a particular location-related telephony party identifier.

At step 9b, the mobile telephony device 103 transmits the membership request message to the service controller 109. At step 9c, the service controller 109 transmits the membership request message to the group management server 112 for processing.

In some embodiments, the group management server 112 may be configured to accept all membership requests for registration against a particular location-related telephony party identifier.

In other embodiments, the group management server 112 may be configured only to accept a membership request if the requesting mobile telephony device (in this example, mobile telephony device 103) is currently located in the one or more target geographic region(s) associated with the location-related telephony party identifier. Other membership criteria, such as entry of a secret password or the like, may be employed in certain situations.

In such other embodiments, at step 9d, the group management server 112 transmits a location request message to the location server 110 to determine the current location of the requesting mobile telephony device 103. In some embodiments, the location server 110 may be able to determine the location of mobile telephony device 103 by querying the location database 111. In other embodiments, the location server 110 may transmit, at step 9e, a location update request to mobile telephony device 103 to determine its current location, possibly via the LSP 107. In such other embodiments, the mobile telephony device 103 responds at step 9f with location information identifying its current location, possibly via the LSP 107. The location server 110 then responds to the location request message of step 9d by transmitting a location response message to the group management server 112 at step 9g identifying the current location of the requesting mobile telephony device 103.

In the embodiments in which the group management server 112 is configured to accept a membership request if the requesting mobile telephony device 103 is currently located in the one or more target geographic region(s) associated with the location-related telephony party identifier, the group management server 112 then determines whether the requesting mobile telephony device 103 is currently located in the one or more target geographic region(s). If so, then the requesting mobile telephony device 103 is registered against the location-related telephony party identifier and the group management server 112 updates the group management database 113 accordingly.

At step 9h, the group management server 112 informs the service controller 109 of the result of the membership request. The service controller 109 informs the requesting mobile telephony device 103 accordingly at step 9i. Alternatively, the group management server 112 may inform the requesting mobile telephony device 103 directly of the result of its membership request. The requesting mobile telephony device 103 may then display the result of the membership request to user A via a display device (not shown) associated with the mobile telephony device 103.

Figure 10:
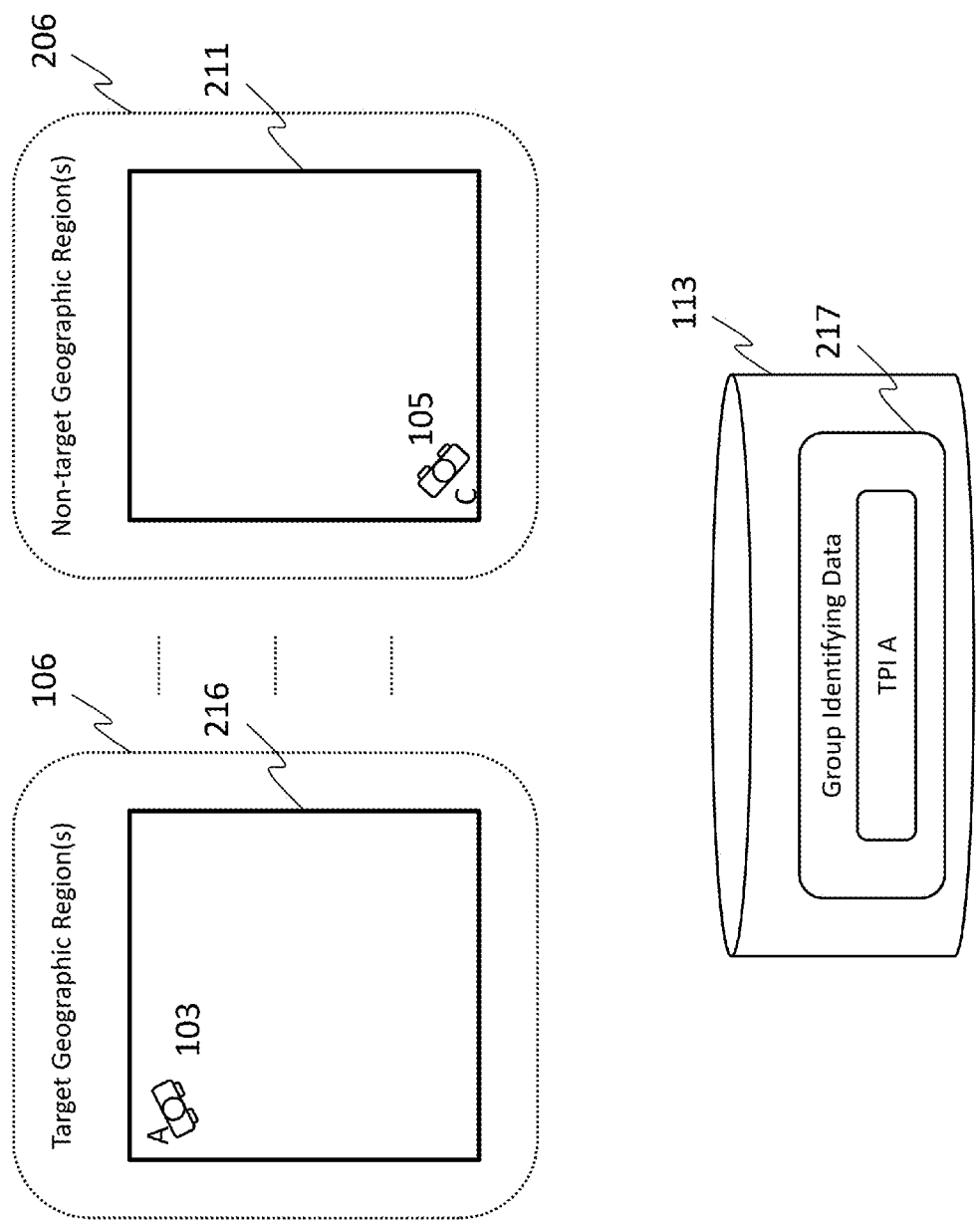
FIG. 10 is a schematic representation of a target geographic region according to preferred embodiments.

FIG. 10 is a schematic representation of change to the example shown in FIG. 2 in which mobile telephony device 104 and its user, user B, leaves the one or more target geographic region(s).

In accordance with some embodiments, the mobile telephony party identifier B representing the mobile telephony device 104 is automatically removed from the group identifying data for the location-related telephony party identifier associated with the one or more target geographic region(s) when the mobile telephony device 104 leaves the one or more target geographic region(s).

In this example, the group identifying data 217 in the group management database 113 is updated to reflect the fact that the mobile telephony device 104 is not currently located in the one or more target geographic region(s).

Figure 11:
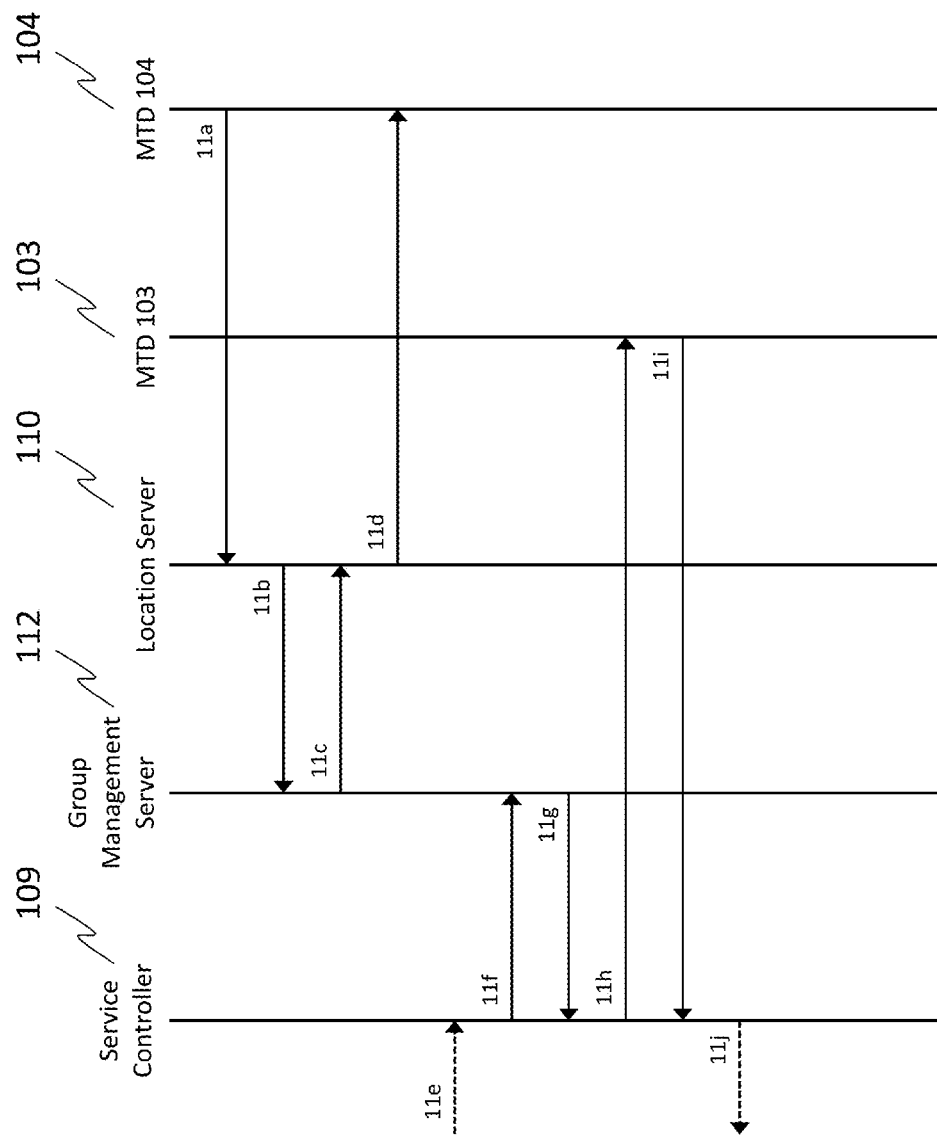
FIG. 11 is a sequence diagram showing a method of routing an incoming call setup request in accordance with preferred embodiments.

FIG. 11 is a sequence diagram showing a method of processing an incoming request message in the form of a call setup request in accordance with some embodiments.

At step 11a, mobile telephony device 104 provides a location update to the location server 110 directly (as shown) or via the service controller 109 (not shown). The location update may be in response to a request from the location server 110 (not shown) or some other event that causes to the mobile telephony device 104 provide the location update. The location update includes location information for mobile telephony device 104 which indicates that mobile telephony device 104 is no longer in the one or more target geographic region(s).

At step 11b, the location server 110 may transmit a location update message to the group management server 112 so that the group management server is aware of the current location of the mobile telephony device 104 and, in particular, that the mobile telephony device 104 is not currently located in the one or more target geographic region(s). The group management server 112 may remove MTPI B representing the mobile telephony device 104 from the group identifying data for the location-related telephony party identifier associated with the one or more target geographic region(s).

At step 11c, the group management server 112 may transmit an acknowledgement message to the location server 110 indicating that it has updated the group identifying data to reflect the fact that the mobile telephony device 104 is no longer in the target geographic region(s). At step 11d, the location server 110 transmits an appropriate message to the mobile telephony device 104. The mobile telephony device 104 may display a suitable message to its user using a display device (not shown) associated with the mobile telephony device 104.

At step 11e, the service controller 109 receives a call setup request message addressed to location-related TPI A. At step 11f, the service controller 109 transmits a mobile telephony party identifier request message, including location-related TPI A, to the group management server 112 to determine which mobile telephony device(s) (in this example, only mobile telephony device 103) is or are located in the target geographic region(s) associated with location-related TPI A.

The group management server 112 determines that only mobile telephony device 103 which is represented by MTPI A is currently located in the geographic region(s) associated with location-related TPI A, for example by accessing the group management database 113 using the location-related TPI A, and transmits MTPI A representing mobile telephony device 103 to the service controller 109 at step 11g.

At step 11h, the service controller 109 transmits the call setup request to the mobile telephony device 103 and receives an acknowledgement from the mobile telephony device 103 at step 11i.

At step 11j, the service controller 109 transmits an appropriate message to an originating telephony device.

In a similar manner to that described above, the mobile telephony device 104 may automatically rejoin the group associated with the telephony party identifier upon it subsequently being located in the target geographic region.

Figure 12:
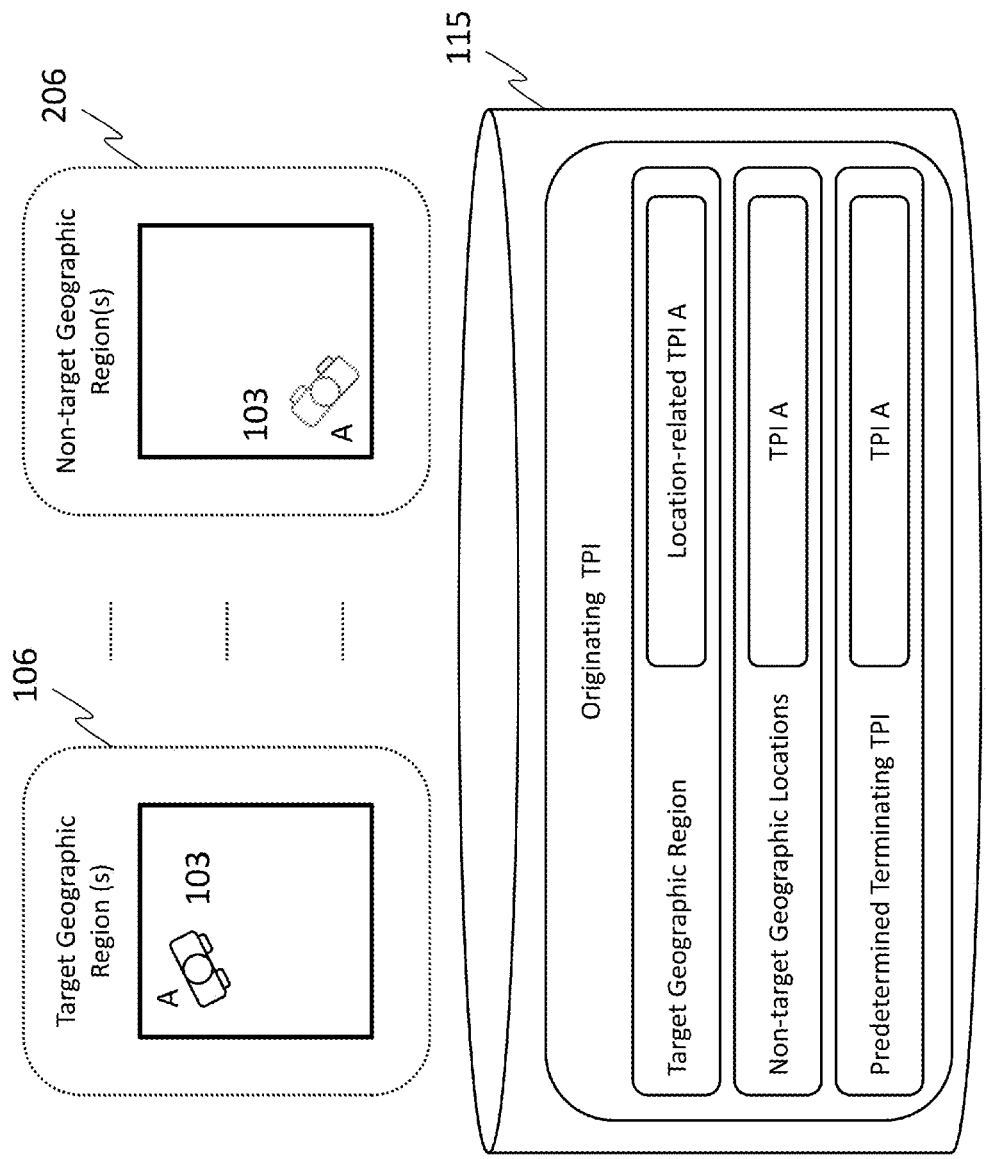
FIG. 12 is a schematic representation of a scenario in which a user can be located in various geographic locations according to preferred embodiments.

FIG. 12 is a schematic representation of an example in which a user A can be located in various geographic regions. User A is associated with a plurality of possible originating telephony party identifiers (for example a work and a personal telephony party identifier) which can be used as originating telephony party identifiers for outgoing request messages, such as call setup request messages, originating from an originating telephony device. Each of the plurality of telephony party identifiers is associated with a different possible location of the user A.

In some embodiments, the user A is associated or associable with multiple telephony devices, which may both be geographically fixed. For example, a SIP user may be associable with telephony devices at their home and office and can log in to one or the other of the telephony devices with their public (SIP) URI depending upon whether they are currently located at home or in their office. As explained above, a SIP registrar maps the public (SIP) URI to the current location of the user and routes messages to the user accordingly. In other embodiments, the user A may have multiple UIDs (for example a work and a personal UID) and a single mobile telephony device that can be located in various different geographic regions served by the telephony network 101. In such other embodiments, the user may wish to use their work UID for outgoing request messages when they are located at work and their personal UID for outgoing request messages when they are located at home. In the embodiments described below, the request message originating from the originating telephony device associated with the user is a call setup request. However, other messages, such as SMS messages, Multimedia Messaging Services (MMS) messages, e-mails and the like are also envisaged.

In FIG. 12, the user A has specified in a record in the outgoing TPI database 115 that a particular location-related identifier, location-related TPI A, should be used as an originating telephony party identifier for outgoing call setup requests from the mobile telephony device 103 of user A when user A is located in a region A. For example, location-related TPI A may be the home telephone number of user A's family home and the target geographic region may include the user's house. It will be appreciated that user A may specify one or more geographic regions in which the location-related TPI A should be used.

In such cases, call setup requests from the mobile telephony device 103 of user A appear as though they originated from the user's home telephone (represented by location-related TPI A) when the user A is at home even though, in fact, they originated from the mobile telephony device 103.

User A has also specified in the record that the location-related TPI A representing mobile telephony device 103 should be used as an originating telephony party identifier for a call setup request originating from the mobile telephony device 103 if the user A is located in one or more non-target geographic region(s). Thus, when user A is not currently at home, call setup requests originating from the mobile telephony device 103 will appear as though they originated from the user's mobile telephony device 103 (represented by MTPI A) and not, for example, from the user's home telephone number.

User A has further specified in the record that MTPI A should be used for all calls to called telephony party identifiers regardless of the actual location of user A. This allows calls to parties (such as calls to emergency services) to be exempted from the above processing when, otherwise, a telephony party identifier other than MTPI A may be have been selected for call setup requests originating from the mobile telephony device 103. This may be useful in situations in which user A wishes all telephone calls to a certain party to appear as though they originated from the mobile telephony device 103. It can also be useful in situations in which use of a telephony party identifier other than MTPI A may be undesirably misleading to the called party.

For example, if the record in the originating TPI database 115 were configured such that calls from the mobile telephony device 103 appear as though they were from a work telephone number when the user is located at home (for example if the user is working from home on a given day), user A may not wish to masquerade as if they were at work, for example if they were calling the emergency services.

Figure 13:
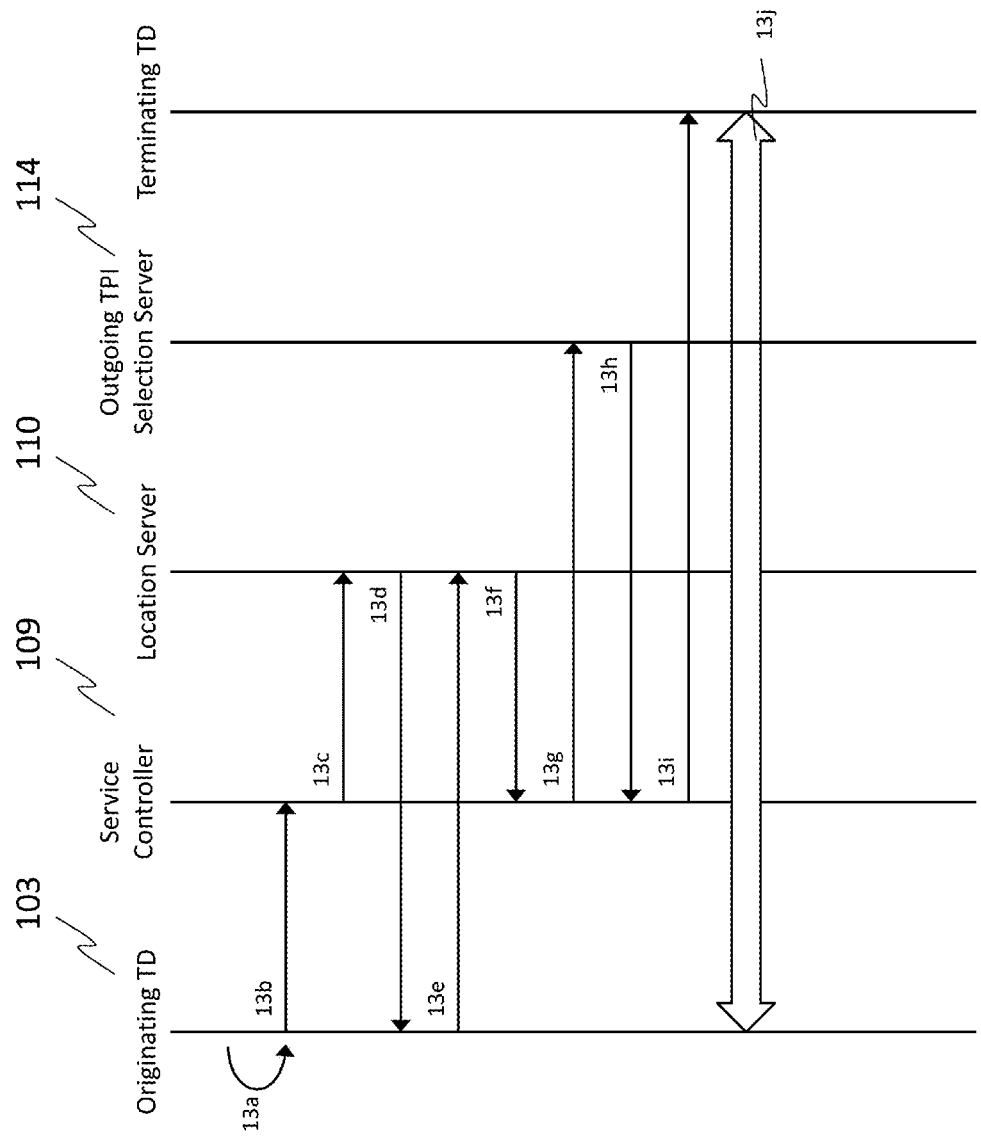
FIG. 13 is a sequence diagram showing a method of processing an outgoing message in a telephony network in accordance with preferred embodiments.

FIG. 13 is a sequence diagram showing a method of processing an outgoing request message in a telephony network in accordance with some embodiments.

At step 13a, user A interacts with the mobile telephony device 103 to identify a terminating telephony device with which they would like to establish a telephony call. User A may manually input all of the digits of a telephone dialing number for the terminating telephony device, may identify the terminating telephony user device from a list of contacts or in some other manner.

The interaction of step 13a causes the mobile telephony device 103 to transmit a call setup request into the telephony network 101, which is intercepted by the service controller 109 at step 13b. Such interception may be as a result of configuring elements of the telephony network 101 to pass call setup requests originating from the mobile telephony device 103 to the service controller 109.

At step 13c, the service controller 109 transmits a location request message to the location server 110. The location request message identifies user A so that the location server 110 can determine the location of user A.

In most cases, the location of user A can be determined by identifying the location of the mobile telephony device 103 associated with the user A. However, in some cases, it may not be possible to determine the location of the mobile telephony device 103, but it may be possible to determine or estimate the location of the user A by some other means, for example as a result of the user logging into a certain computing device, by the user A accessing a certain part of a building or the like.

In this example, however, the location server 110 determines the location of the user A by determining the location of the mobile telephony device 103 associated with the user A. In some embodiments, at step the 13d, the location server 110 transmits a location request message to the originating mobile telephony device 103, possibly via the LSP 107, and receives a location response message from the originating mobile telephony device 103 at step 13e, possibly via the LSP 107. In other embodiments, the location server 110 accesses a record in the location database 111 for the user A (or, in this example, for the mobile telephony device 103) to determine the location of the user A.

At step 13f, the location server 110 transmits a location response message to the service controller 109 which comprises location information identifying the location of the user A.

At step 13g, the service controller 109 provides the location information to the outgoing TPI selection server 114 so that the TPI selection server 114 can select one of the plurality of possible originating telephony party identifiers for the outgoing call setup request. The TPI selection server 114 queries a record in the outgoing TPI database 115 to determine which of the plurality of possible originating telephony party identifiers is associated with the current location of the user A. At step 13h, the outgoing TPI selection server 114 informs the service controller 109 of the selected originating telephony party identifier for the outgoing call setup request.

At step 13i, the service controller uses the selected originating telephony party identifier in a call setup request to the terminating telephony device that was identified in the call setup request received by the service controller 109 at step 13b.

At step 13j, a telephony session is established between the originating mobile telephony device 103 and the terminating telephony device in which the originating telephony party identifier is the telephony party identifier selected by the selection server 114.

Figure 14:
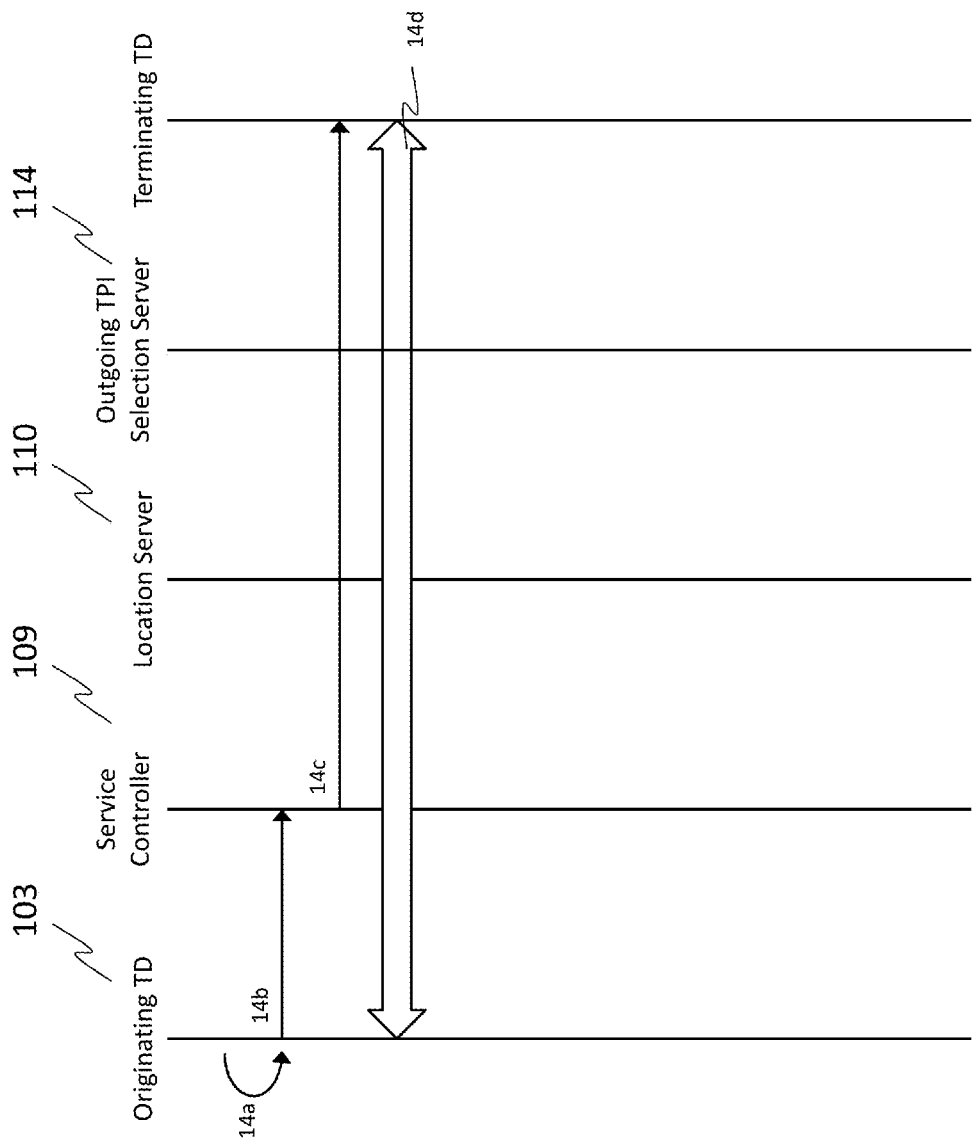
FIG. 14 is a sequence diagram showing a method of processing an outgoing message in a telephony network in accordance with preferred embodiments.

FIG. 14 is a sequence diagram showing a method of processing an outgoing message in a telephony network in accordance with some embodiments. In this case, the user A initiates a telephone call to a telephony party identifier indicated in a record in the originating TPI database 115, for example a telephone dialing number reserved for the emergency services.

Step 14a is similar to step 13a described above in that the user A interacts with the mobile telephony device 103 to input a terminating telephone dialing number.

Step 14b is similar to step 13b described above in that the interaction of step 14a causes the mobile telephony device to transmit a call setup request message into the telephony network 101, which the service controller 109 intercepts at step 14b.

The service controller 109 detects the terminating telephony party identifier in the call setup request and identifies that the call setup request should be forwarded to the terminating telephony party identifier without performing the telephony party identifier selection procedure.

Accordingly, at step 14c, the service controller 109 forwards an outgoing call setup request message towards the terminating telephony party identifier using the originating telephony party identifier; mobile telephony party identifier A.

At step 14d, a telephony session is established between the originating mobile telephony device 103 and the terminating telephony device.

Figure 15:
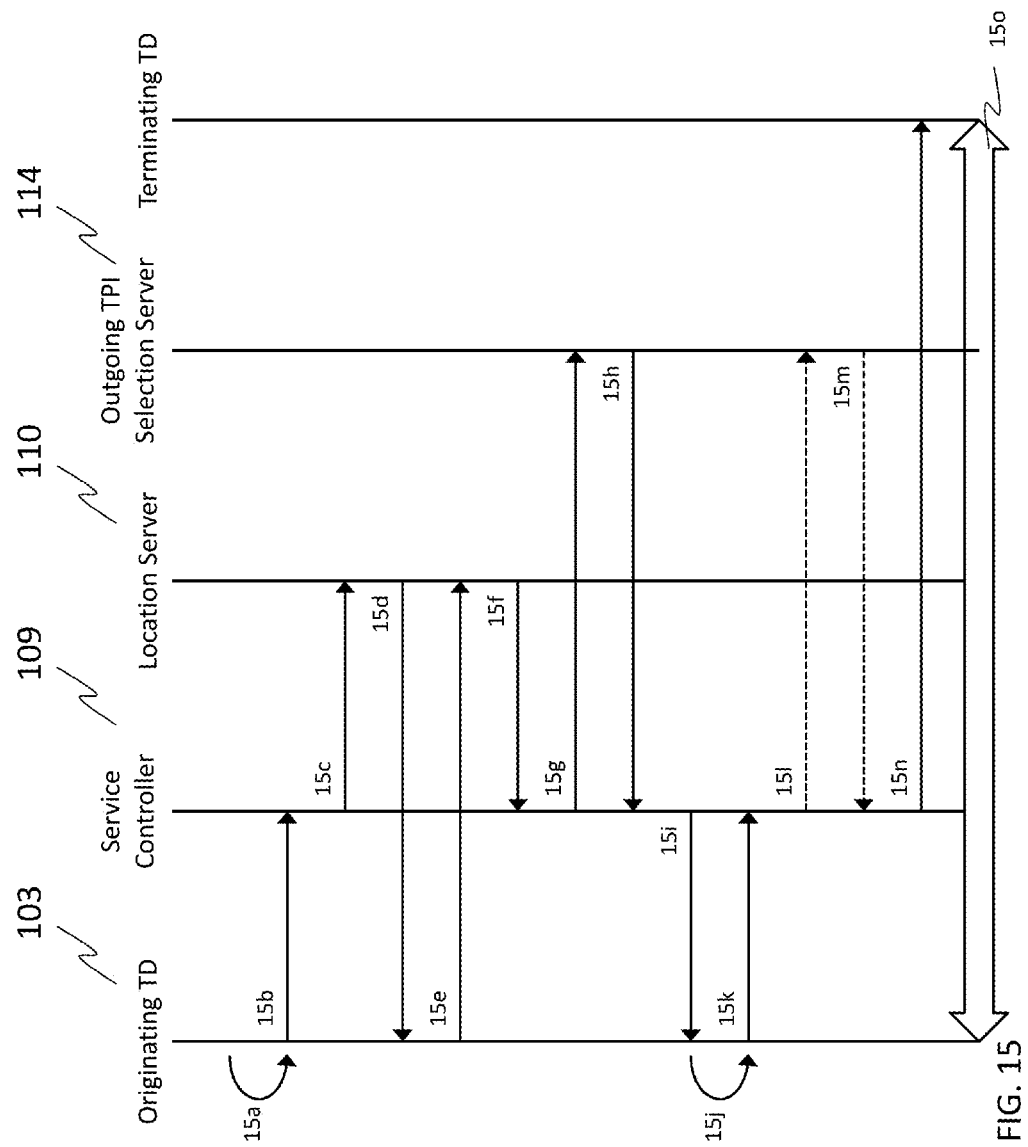
FIG. 15 is a sequence diagram showing a method of processing an outgoing message in a telephony network in accordance with preferred embodiments.

FIG. 15 is a sequence diagram showing an exemplary method of processing a request message in a telephony network. In this case, the user A is presented with a proposed originating telephony party identifier for the outgoing call setup request and has the opportunity to confirm, or override the proposed originating telephony party identifier.

Steps 15a to 15g are similar to steps 13a to 13g described above in relation to FIG. 13 in that a call setup request is initiated by the user A (step 15a), the location of the user A is determined (steps 15d and 15e), and the location of the user A and an identifier for the user A are provided to the outgoing TPI selection server 114 (step 15g).

Step 15h is similar to step 13h described above in that the outgoing TPI selection server 114 identifies one of the possible originating telephony party identifiers for the call setup request based on the location of the user A. However, instead of the outgoing TPI selection server 114 transmitting the identified originating telephony party identifier to the service controller 109 as a selected originating telephony party identifier, the outgoing TPI selection server 114 transmits the identified originating telephony party identifier to the service controller 109 as a proposed originating telephony party identifier for the telephone call.

At step 15i, the service controller 109 transmits an originating telephony party identifier selection request comprising the proposed originating telephony party identifier to the originating mobile telephony device 103. The originating mobile telephony device 103 displays the proposed originating telephony party identifier to the user A using a display device (not shown) associated with the originating mobile telephony device 103 so that the user A can confirm that the proposed originating telephony party identifier should be used for the call setup request. The user A may be presented with alternative possible originating telephony party identifiers for the call setup request from which they can select an alternative originating telephony party identifier if it is more appropriate for the call setup request.

At step 15j, the user A interacts with the originating mobile telephony device 103 to confirm that the proposed originating telephony party identifier should be used for the call setup request or selects an alternative originating telephony party identifier for the call setup request.

At step 15k, the originating mobile telephony device 103 transmits an originating telephony party identifier selection response message to the service controller 109 based on the input from the user A of step 15j.

At step 15l, the service controller 109 may optionally transmit an originating telephony party identifier preference message to the outgoing TPI selection server 114. In such cases, the outgoing TPI selection server 114 stores the originating telephony party identifier approved by the user A in a record in the originating telephony party identifier record for the user A in the outgoing TPI database 115. If the user A initiates a telephone call setup request in similar circumstances (for example in the same location and to the same terminating telephony party identifier) in the future, the originating telephony party identifier server 114 may use the originating telephony party identifier preference record for the user A to propose or select the same originating telephony party identifier for that future call setup request. In the event that the service controller 109 did transmit the originating telephony party identifier preference message to the originating telephony party identifier server 114 at step 15l, the originating telephony party identifier server 114 acknowledges receipt of the originating telephony party identifier preference message to the service controller 109 at step 15m.

At step 15n, the service controller 109 transmits an outgoing call setup request message towards the terminating telephony party identifier using the selected originating telephony party identifier.

At step 15o, a telephony session is established between the originating mobile telephony device 103 and the terminating telephony device.

Figure 16:
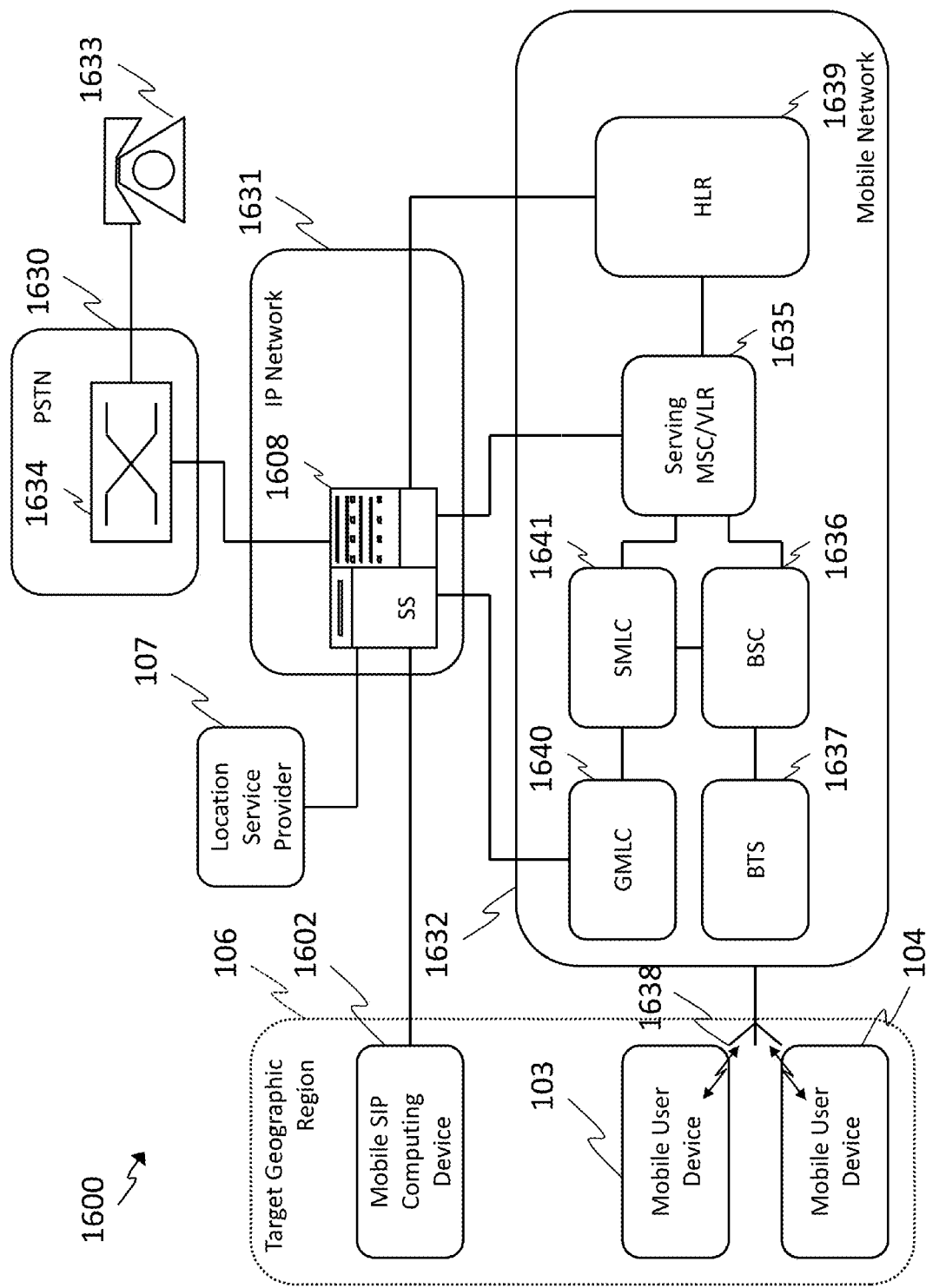
FIG. 16 shows a system diagram according to preferred embodiments.

FIG. 16 shows a system diagram according to some embodiments.

FIG. 16 shows a telecommunications system 1600 in which the telecommunications network comprises includes a PSTN 1630, an Internet Protocol (IP) network 1631 and a mobile telephony network 1632. In this embodiment, telephony service is hosted by a call control system 1608 located in the IP network where data is primarily transferred using an Internet Protocol (also called an IP domain). The call control system 1608 implements the service platform 108 shown in FIG. 1 and discussed above. The IP network 1631 interfaces with the PSTN and also the mobile network 1632. The mobile network 1632 may also interface directly (not shown) with the PSTN 1630.

The interfaces between PSTN 1630, IP network 1631, and mobile network 1632 may include one or more gateway or session border controller entities (not shown) which carry out conversion between the various protocols and data formats used to transfer media data and signalling data in the different networks making up the telecommunications system 1600. A media gateway (not shown) converts between the different protocols of media data passing between the PSTN 1630, the IP network 1631 and the mobile network 1632 such as packetized Voice over Internet Protocol (VoIP) data into Time-Division-Multiplexing (TDM) voice data and vice versa. A signalling gateway (not shown) converts between the different protocols of signalling information passing between the PSTN 1630, the IP network 1631 and the mobile network 1632 such as SIP, Signalling System 7 (SS7), Integrated Services Digital Network User Part (ISUP), American National Standards Institute (ANSI)-41 and Mobile Application Part (MAP) formats The IP network 1631 provides telephony services to an IP-compliant computing device 1602, such as a Voice over Internet Protocol (VoIP) telephone or a SIP telephone. The IP-compliant telephony device 1602 is provided with a telephony service via the call control system 1608.

The call control system 1608 may comprise a Media Gateway Controller (MGC), service platform, call agent or softswitch and may perform other functions typically associated with such entities. The term 'softswitch' is used hereinafter to refer to the call control system 1608 (denoted 'SS in FIG. 16). One or more media and/or signalling gateways interfacing between the PSTN 1630, the IP network 1631, and the mobile network 1632 may be controlled by the softswitch 1608, or their function may be combined into the softswitch 1608 itself.

As well as conventionally providing the architecture for enabling conversion between both media data and signalling protocols via one or more media gateways and signalling gateways, the softswitch 1608 may conventionally provide call processing intelligence for use in the selection of processes that can be applied to a call, routing for a call based on signalling and subscriber database information, the ability to transfer control of a call to another network element and management functions such as provisioning, fault detection and billing. The softswitch 1608 also provides the architecture for enabling conversion between signalling protocols, such as SS7 and SIP, and circuit-switched and packet-based voice calls. For ease of explanation, it is hereafter assumed that the softswitch is one network entity, although in practice it may comprise a distributed set of entities or components, such as the components 109, 110, 111, 112, 113, 114, 115 of the service platform 108 described above in relation to FIG. 1.

The PSTN 1630 allows for provision of telephony services to a number of fixed-line telephones (also called landline or wireline telephones) although in this example only a single fixed-line telephone 1633 is depicted. The PSTN 1630 contains an originating local telephone exchange switch 1634 (such as a 'class 5' switch) which provides telephony services to and from, i.e. serves, the fixed-line telephone 1633. In reality, the local telephone exchange switch 1634 also serves other telephones (not shown) located in the PSTN 1630.

The mobile network 1632 allows for provision of telephony services to a number of mobile telephony devices, although in this example only two mobile telephony devices 103, 104 are depicted. In this embodiment, the mobile network is a GSM network comprising a serving MSC 1635 connected via a communications link to a BSC 1636. The BSC 1636 controls a BTS 1637 located remote from, and connected by a further communications link to, the BSC 1636. The BTS 1637 transmits radio signals to, and receives radio signals from, the mobile telephony devices 103, 104 via a radio interface 1638. The mobile telephony devices 103, 104 are located in an area (commonly known as a 'cell') served by the BTS 1637. In reality, a number of BSCs and BTSs would be dispersed geographically across an area served by the MSC 1635 and multiple mobile telephony devices 103, 104 could communicate via the BTS 1637.

In FIG. 16, the MSC 1635 is depicted as a serving MSC as it provides a telephony service to a number of mobile telephony devices including the mobile telephony devices 103, 104. The serving MSC 1635 is also connected via communications links to other MSCs (not shown) in the mobile network 1632. The mobile network 1632 is provided with a Home Location Register (HLR) 1639, which is a database arranged to provide the serving MSC 1635 with data relating to subscribers and location of mobile telephony devices 103, 104 within the network upon request. The mobile network 1632 also includes a GMLC 1640 and a SMLC 1641 that have been discussed in detail above.

Subscribers may originate or receive a range of data services via their mobile telephony devices, including multimedia, video, voice, data or fax calls or sessions, short messages using the SMS, e-mail messages, enhanced or multimedia messages, and may access data resources over private or public data networks such as the Internet. Signalling data and media data in respect of services provided to the mobile telephony devices 103, 104 is routed via the serving MSC 1635.

Figure 17A:
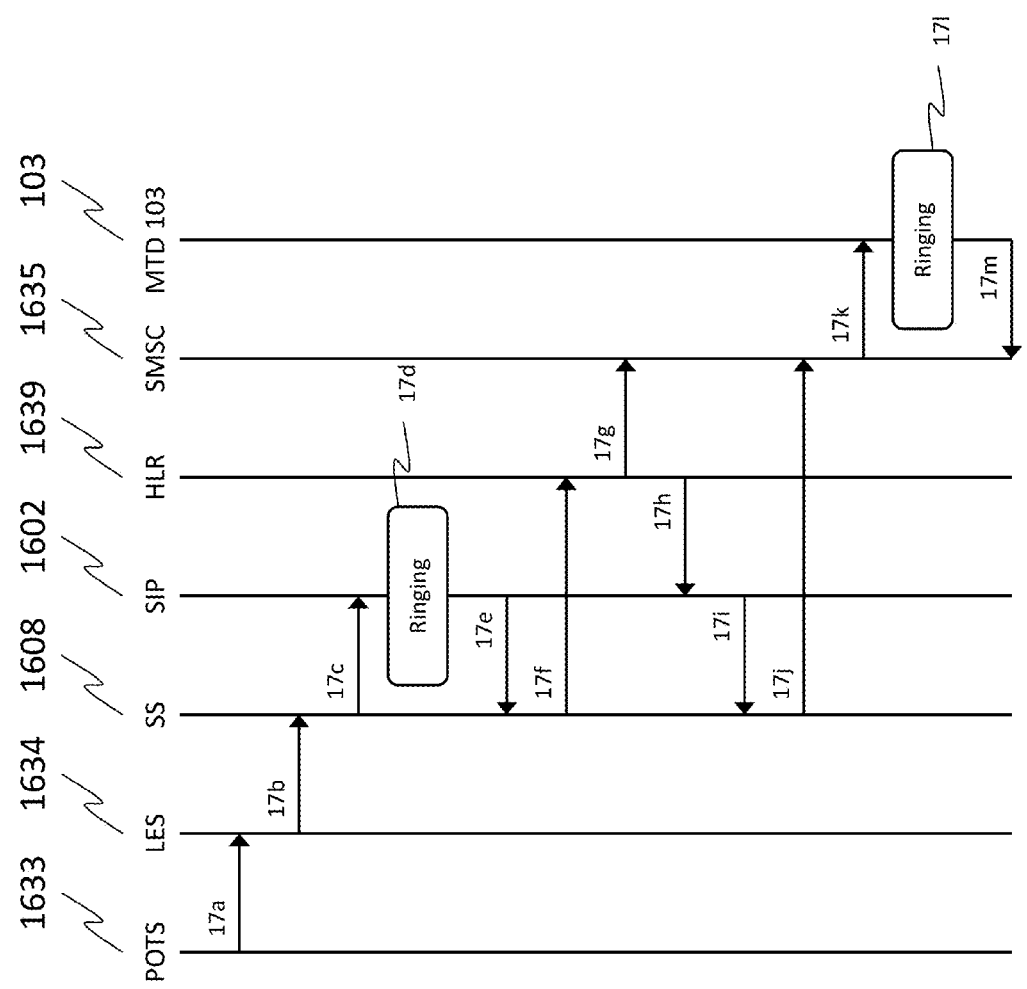
FIGS. 17A and 17B are a sequence diagram showing a method of processing an incoming call setup request according to preferred embodiments.
Figure 17B:
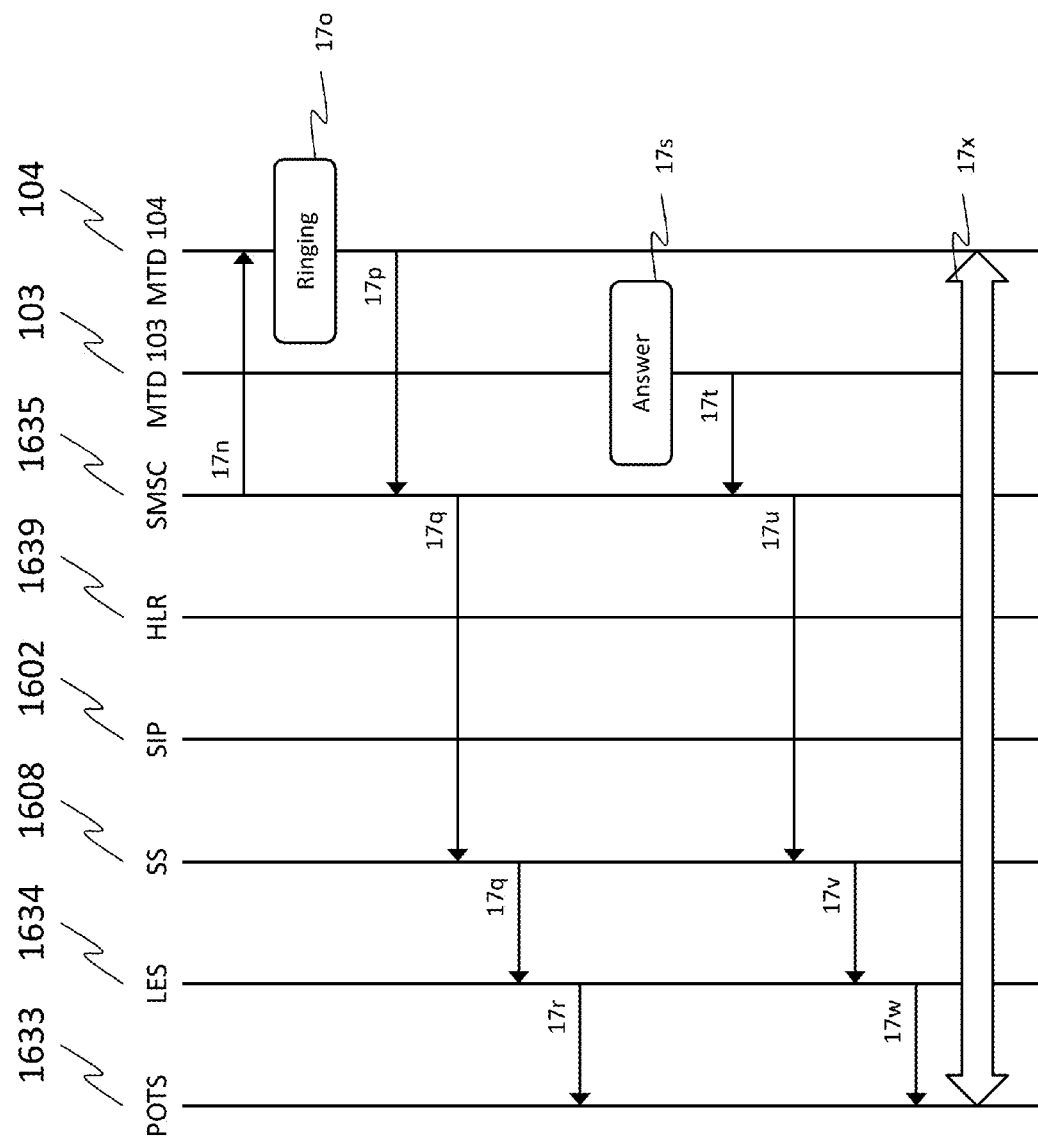

FIGS. 17A and 17B are a sequence diagram showing a method of processing an incoming call setup request according to some embodiments.

In this embodiment, before the service is operational, the locations of the mobile SIP computing device 1602 and the mobile telephony devices 103, 104 are registered with certain network entities.

The mobile SIP computing device 1602 registers its current location in the IP network with the softswitch 1608, so that the softswitch 1608 knows how to direct incoming calls to the mobile SIP computing device 1602. This registration process may be carried out using SIP Register functionality where a SIP Register message is sent from the mobile SIP computing device 1602 to the softswitch 1608 containing data identifying the mobile SIP computing device 1602 and where it is located, for example sip_phone@this_domain.com. Registration may be carried out initially and then at periodic intervals subsequently. The softswitch 1608 is then able to use the register association (commonly referred to as a 'binding') to address SIP messages to the mobile SIP computing device 1602. Alternatively, the mobile SIP computing device 1602 may register its location with a SIP registrar network entity or SIP proxy server (not shown) responsible for processing registration of devices which can then be contacted by the softswitch 1608 to ascertain the location of the mobile SIP computing device 1602 in the IP network 1631.

When one of the mobile telephony devices 103, 104 enters a cell served by the serving MSC 1635, it registers its current location with the serving MSC 1635. The serving MSC 1635 updates an appropriate visitor location register (VLR) which may be remote from or may be incorporated into the serving MSC 1635. The serving MSC 1635 notifies the HLR 1639 of the location of the mobile telephony device 103, 104 and notifies the MSC/VLR serving the cell where the mobile telephony device 103, 104 was previously located that the mobile telephony device 103, 104 is no longer there (although a VLR may be shared across several MSCs so such a location update may not need to be registered).

Use of the service begins when a calling party wishes to make a call to a location-related telephony party identifier associated with one or more target geographic region(s). In this embodiment, the calling party telephony device is an analogue telephone 1633 (sometimes called a black-phone or Plain Old Telephone Service (POTS) phone) located in the PSTN 1630.

At step 17*a*, the calling party dials a particular telephony party identifier which causes an initial call setup request to be transmitted to the originating local telephone exchange switch 1634 which serves the calling party telephony device. The originating local telephone exchange switch 1634 has been configured to generate an incoming call setup request for calls directed to the particular telephony party identifier, which is transmitted to the softswitch 1608 at step 17*b*. This can be seen as the local telephone exchange switch 1634 forwarding on the initial call setup request of step 17*a* in the form of the incoming call setup request of 17*b* to the softswitch 1608.

The softswitch 1608 processes the incoming call setup request of step 17*b* and identifies that the request includes the particular telephony party identifier, which it recognises as a location-related telephony party identifier. The softswitch 1608 assumes control of the call and uses the location-related telephony party identifier to determine the recipient mobile telephony devices for the incoming call setup request by accessing group identifying data including a group of mobile telephony party identifiers representing mobile telephony devices currently within the target geographic region(s) associated with the location-related telephony party identifier. In this case, the softswitch 1608 determines that the incoming call setup request should be routed to mobile SIP computing device 1602 and mobile telephony devices 103 and 104 because they are currently located in the target geographic region(s) associated with the location-related telephony party identifier. The softswitch 1608 proceeds to create call legs to each of the mobile telephony party identifiers.

At step 17*c*, a first outgoing call setup request is sent to the mobile SIP computing device 1602 in the form of a SIP INVITE message. At step 17*d*, the mobile SIP computing device 1602 begins to ring and typically responds by sending a SIP 180 Ringing message back to the softswitch 1608 at step 17*e*.

Before a call setup request is sent to the mobile telephony devices 103, 104, the location of the mobile telephony devices 103, 104 within the mobile telephony network 1632 is determined. This is carried out by the softswitch 1608 transmitting a location query identifying the mobile telephony devices 103, 104 to the HLR 1639 at step 17*f*, for example in the form of a 'LOCREQ' message as per the ANSI-41 standard. The HLR 1639 then requests Temporary Local Directory Numbers (TLDNs) from the serving MSC 1635 at step 17*g*, for example in the form of 'ROUTREQ' messages as per the ANSI-41 standard. The serving MSC 1635 allocates TLDNs for the calls to the mobile telephony devices 103, 104 and responds to the HLR 1639 accordingly at step 17*h*. The HLR 1639 then forwards the allocated TLDNs to the softswitch 1608 at step 17*i*.

The softswitch 1608 transmits outgoing call setup requests to the mobile telephony devices 103, 104 via the serving MSC 1635 at step 17*j*, for example in the form of an Initial Address Message (IAM) as per the Integrated Services Digital Network User Part (ISUP) standard which is a sub-protocol of the Signalling System #7 (SS7) protocol. The serving MSC 1635 sets up a call to the mobile telephony devices 103, 104 at steps 17*k* and 17*n*, which start to ring accordingly at steps 17*l* and 17*o*. At steps 17*m* and 17*p*, the mobile telephony devices 103 and 104 return messages informing the serving MSC 1635 that they are ringing, for example in the form of an Address Complete Message (ACM) as per the ISUP standard. The serving MSC 1635 transmits ACM messages to the softswitch 1608 at step 17*q*. The softswitch 1608 transmits a corresponding message to the LES 1634 at step 17*r* which causes, at step 17*s*, a ringback tone to be generated at the POTS telephone 1633 so that the calling party is aware that the telephony devices 1602, 103, 104 are ringing.

All of the telephony devices 1602, 103, 104 are now ringing and, in this case, the mobile telephony device 103 is answered at step 17*s*, which causes an answer message to be transmitted from the mobile telephony device 103 to the serving MSC 1635 at step 17*t*. The serving MSC 1635 informs the softswitch 1608 that the telephone call has been answered at the mobile telephony device 103 by transmitting a call connection response at step 17*u*, for example in the form of an Answer Message (ANM) as per the ISUP standard. The softswitch 1608 forwards the ANM message to the calling party telephone 1633 via the originating local telephone exchange switch 1634 at steps 17*v* and 17*w*.

A call is now connected between the calling party telephone 1633 and the mobile telephony device 103 and media data (for example voice data) may flow between the two (see item 17*x*). The mobile SIP computing device 1602 was not answered, so the softswitch 1608 cancels the call setup request to it, for example by transmitting a SIP CANCEL message to the mobile SIP computing device 1602 (not shown). The softswitch 1608 also cancels the call setup request to the other mobile telephony device 104, by transmitting an appropriate message to the other mobile telephony device 1602 via the serving MSC 1635 (not shown).

Figure 18:
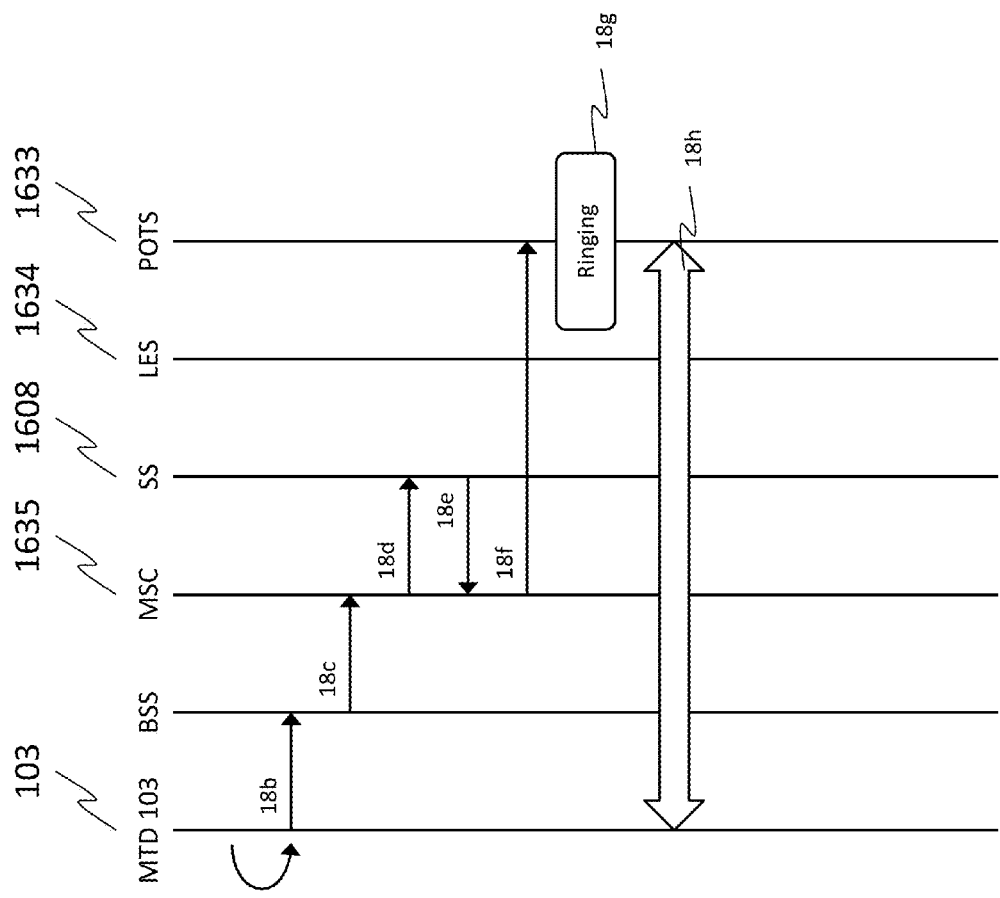
FIG. 18 is a sequence diagram showing a method of processing an outgoing message according to preferred embodiments.

FIG. 18 is a sequence diagram showing a method of processing an outgoing request message according to some embodiments. In this example, the outgoing request message is a call setup request message.

Processing begins at step 18*a* when the user A of mobile telephony device 103 wishes to call the POTS telephone 1633 in the PSTN 1630. The POTS telephone 1633 has been assigned an Integrated Services Digital Network (ISDN) number, which the user A inputs into the mobile telephony device 103 in any appropriate manner.

After the mobile telephony device 103 has requested access and undergone any necessary authentication with the BSS, the mobile telephony device 103 transmits a Call Setup (SETUP) request to the BSS at step 18*b*, which includes the called and calling party directory numbers; the ISDN number of the POTS telephone 1633 and the MSISDN of the originating mobile telephony device 103. The BSS forwards the SETUP message to the serving MSC 1635 at step 18*c*. In this embodiment, the serving MSC 1635 is configured so that calls from the mobile telephony device 103 trigger a first call routing query to be sent to the softswitch 1608 at which call processing and control functions are carried out. The serving MSC 1635 may be configured to query a subscriber database for transmission data identifying the location of the softswitch 1608, to determine where to transmit call routing queries to. The response provided by the softswitch 1608 to a call routing query can be interpreted by the mobile network 1632 so as to determine how to treat the call. The exact nature of the call routing query depends upon mobile network technology particular to the mobile network 1632, for example based upon the Wireless Intelligent Network (WIN) or Customised Applications for Mobile networks Enhanced Logic (CAMEL) standards.

In some cases, the serving MSC 1635 has been configured with a trigger so that when it detects a call setup request originating from the mobile telephony device 103 (based on the detected calling party identifier in the SETUP message), it passes the call setup request to the softswitch 1608 at step 18*d* in the form or an ISUP IAM message. Using ISUP IAM messaging, the mandatory variable and optional parts of the framework allow telephony party identifiers to be inserted into the signalling information for calls made in a carrier network. The signalling information can include data fields that identify the calling and called parties involved in the call.

The softswitch 1608 detects the calling party identifier in the ISUP IAM messaged received from the serving MSC 1635 at step 18*d*, assumes responsibility for the call and determines that the user A of mobile telephony device 103 is a subscriber to a service in which the user A is associated with a plurality of possible originating telephony party identifiers for the call setup request, the possible originating telephony party identifiers being associated with different possible geographic locations of the user A.

The softswitch 1608 selects an originating telephony party identifier for the outgoing call setup request from the plurality of possible originating telephony party identifiers.

In some embodiments, the softswitch 1608 determines the location of the user A (for example by transmitting a location request to the GMLC 1640, an LSP 107 (see FIG. 1), to the originating mobile telephony device 103 itself or by some other means) and selects an originating telephony party identifier associated with the user A being in that determined location. For example, the softswitch 1608 may determine that the MSISDN included in the ISUP IAM message should be replaced with a work telephone number if the user A is located in one or more target geographic region(s) associated with their office. In such cases, the softswitch 1608 can insert the selected originating telephony party identifier into the outgoing ISUP IAM message, either replacing the MSISDN with the work telephone dialing number or adding the work telephone dialing number into an appropriate field in the ISUP IAM message.

In some embodiments, the softswitch 1608 detects that the called party identifier in the ISUP IAM message is a telephony party identifier (for example a telephony party identifier for the emergency services) and that it should forward the call setup request without modifying the calling party telephony party identifier of the mobile telephony device 103. In such cases, the softswitch 1608 need not determine the location of the user A and/or the mobile telephony device 103 of the user A.

The softswitch 1608 determines how to route the call setup request to the POTS telephone 1633 in the PSTN 1630 based on the called party number of the POTS telephone 1633 in the ISUP IAM message. The softswitch 1608 determines that the call setup request should be routed to the LES 1634 and, as such, forwards the ISUP IAM message to the LES 1634 at step 18*e*. The calling party identifier field in the ISUP IAM message may or may not have been modified, or an additional field for the selected originating telephony party identifier may have been added, by the softswitch 1608.

At step 18*f*, the LES 1634 transmits a SETUP request to the POTS telephone 1633 which causes the POTS telephone 1633 to ring at step 18*g*. If a calling party identification service such as Calling Line Identifier (CLI) is employed, the originating telephony party identifier for the call setup request will be identified at the POTS telephone 1633.

In a somewhat similar manner to that described above in relation to FIG. 17, a telephony session can then be established between the originating mobile telephony device 103 of user A and the POTS telephone 1633 (see item 18*h*).

Although processing with reference to FIG. 18 has been explained in a situation in which the call setup request originates from the mobile telephony device 103 associated with the user A, it is equally applicable if the call setup request originates from a mobile SIP computing device 1602 associated with the user A. In such cases, call setup is initiated via a SIP INVITE message, which includes a "To" header for a called party telephony party identifier and a "From" header for a calling party telephony party identifier. The "From" header is populated by the calling SIP User Agent (UA) (in this case the mobile SIP computing device 1602) and, as such, could be modified by the SIP UA prior to transmission of the SIP INVITE message to specify a selected originating telephony party identifier for the outgoing call setup request based on the location of the user A and/or the location of the mobile SIP computing device 1602. Alternatively, softswitch 1608 may receive the SIP INVITE message from the mobile SIP computing device 1602 and modify the "From" header or add another header such as a Remote-Party-ID header which includes the selected telephony party identifier for the outgoing call setup request. Either way, if CLI is enabled at the POTS telephone 1633, the selected originating telephony party identifier can be identified for the incoming call.

In a first exemplary embodiment of the invention, there is provided a method of processing an incoming request message and transmitting outgoing request messages to telephony devices located in various different geographic regions of a telephony system, the telephony devices in the telephony system including at least one group of potential recipient telephony devices, a said group of potential recipient devices including mobile telephony devices that can move between said various different geographic regions, the method comprising:

receiving an incoming request message, the incoming request message comprising a telephony party identifier;

recognising said telephony party identifier as a telephony party identifier to be subject to location-based processing;

determining a subgroup of said group of potential recipient telephony devices, said subgroup including one or more potential recipient telephony devices currently within one or more target geographic regions associated with the recognised telephony party identifier; and transmitting an outgoing request message to at least one of the one or more potential recipient telephony devices in said subgroup.

As such, whilst the incoming request may comprise only a single telephony party identifier, the outgoing request message can be targeted at the telephony device(s) in the target geographic region(s) to provide location-targeted communications services within the telephony system. The outgoing request message may be targeted at several telephony devices in the subgroup of telephony devices in the target geographic region(s) to provide location-targeted communications services within the telephony system. It may, therefore, be possible for an originating party to transmit a request message to a telephony party identifier and for an outgoing request message to be transmitted to several telephony devices in the target geographic region(s).

Some embodiments comprise transmitting an outgoing request message to all of the different telephony party identifiers associated with the one or more potential recipient telephony devices in said subgroup. In such embodiments, the outgoing request message can be targeted at all telephony devices in the subgroup of telephony devices in the target geographic region(s) to provide location-targeted communications services within the telephony system. It may, therefore, be possible for an originating party to transmit a request message to a telephony party identifier and for an outgoing request message to be transmitted to several telephony devices in the target geographic region(s).

In some embodiments, the incoming request message comprises an incoming signalling message. Such embodiments can provide location-targeted processing of signalling messages within the telephony system.

In some embodiments, the incoming signalling message comprises an incoming telephone call setup request. Such embodiments can provide location-targeted processing of telephone calls to one or more telephony device(s) in the target geographic region(s).

In some embodiments, the telephony party identifier, which is recognised as the telephony party identifier to be subject to location-based processing, comprises a telephone dialing number. In such embodiments, the telephony party identifier may be in a convenient form to include in the incoming request message and can be recognised as a telephony party identifier to be subject to location-based processing associated with the one or more target geographic regions.

In some embodiments, the telephony party identifier, which is recognised as the telephony party identifier to be subject to location-based processing, comprises a Session Initiation Protocol (SIP) telephony party identifier. In such embodiments, the telephony party identifier may be in a convenient form to include in the incoming request message and can be recognised as a telephony party identifier to be subject to location-based processing associated with the one or more target geographic regions.

In some embodiments, the telephony devices in the telephony system include a plurality of groups of potential recipient telephony devices, and the telephony party identifier, which is recognised as the telephony party identifier to be subject to location-based processing, uniquely identifies a group of potential recipient telephony devices. Such embodiments allow potential recipient telephony devices to be logically grouped together and identified by the telephony party identifier. In some cases, an originating party transmitting the incoming request message may be able to use the telephony party identifier to identify the group of potential recipient telephony devices when they transmit the request message.

In some embodiments, the telephony party identifier, which is recognised as the telephony party identifier to be subject to location-based processing, comprises a geographic region identifier identifying the one or more target geographic regions. In such embodiments, the incoming request message can identify the one or more target geographic regions in which the potential recipient telephony devices are to be located.

In some embodiments, the geographic region identifier includes geographic coordinate data identifying a target geographical region. Such embodiments provide location information that may be used to determine the one or more target geographical regions.

In some embodiments, the subgroup includes one or more mobile telephony devices as potential recipient telephony devices currently within the one or more target geographic regions associated with the recognised telephony party identifier, and said determining comprises determining a current location of said one or more mobile telephony devices. Such embodiments provide for telephony devices whose geographic locations can readily change.

In some embodiments, said determining the current location comprises transmitting location request messages to one or more mobile telephony devices in said group and receiving location response messages from said one or more mobile telephony devices in said group. Such embodiments provide a convenient method for locating the mobile telephony device(s), for example depending on the location determining capabilities of the telecommunications system and/or the telephony device(s).

In some embodiments, said transmitting location request messages is prior to receiving the incoming request message. In such embodiments, the location(s) of the one or more mobile telephony devices may be known in advance of receiving the incoming request message so that the incoming request message can be processed efficiently once is received, for example if location determination could introduce an undesirably long processing delay if it were not performed prior to receiving the incoming request message.

In some embodiments, said determining the current location comprises obtaining location information for one or more mobile telephony devices in said group from a location service provider. Such embodiments provide a convenient manner for locating the mobile telephony device(s), for example depending on the location determining capabilities of the telecommunications system and/or the telephony devices.

Some embodiments comprise storing subgroup identifying data for identifying telephony devices in said subgroup, adding a mobile telephony device to the subgroup identifying data upon detecting that a mobile telephony device in said group is currently within the one or more target geographic regions associated with the telephony party identifier to be subject to location-based processing, and removing said mobile telephony device from the subgroup identifying data upon detecting that said mobile telephony device in said group is not currently within the one or more target geographic regions associated with the telephony party identifier to be subject to location-based processing. Such embodiments can provide information as to which telephony devices are currently located within the target geographic region(s). This may result in more efficient processing of the incoming request message when it is received.

Some embodiments comprise storing group identifying data for identifying telephony devices in said group. Such embodiments store data that can be used to provide additional services in the telephony system.

Some embodiments comprise monitoring mobile telephony devices within the one or more target geographic regions and, upon detecting a mobile telephony device having a mobile telephony party identifier that is not included in the group identifying data for the one or more target geographic regions, transmitting an invitation to the detected mobile telephony device to have the mobile telephony party identifier representing the detected mobile telephony device included in the group identifying data. Such embodiments may provide a method by means of which mobile telephony devices may be included in the group of potential recipient telephony devices. In this case, the mobile telephony devices are invited to be included in the group.

Some embodiments comprise receiving from a user a request to have a telephony party identifier representing a telephony device included in the group identifying data, and including the telephony party identifier representing the telephony device in said group identifying data. Such embodiments may provide a method by means of which mobile telephony devices may be included in the group of potential recipient telephony devices. In this case, the mobile telephony devices request inclusion in the group.

Some embodiments comprise transmitting outgoing request messages originating from telephony devices in said group, and may comprise setting the telephony party identifier, which is subject to location-based processing for an incoming request message, as an originating telephony party identifier for an outgoing request message when the associated device is in the one or more target geographic regions. In such embodiments, the telephony party identifier which is included in the incoming request message can, additionally, be used for outgoing request messages from a telephony device in the group when the telephony devices is in the target geographic region(s).

Some embodiments comprise receiving an incoming request message originating from a telephony device in said group, and replacing an originating telephony party identifier in said received incoming request message with the telephony party identifier, which is subject to location-based processing for an incoming request message, as an originating telephony party identifier in the outgoing request message when the associated device is in the one or more target geographic regions. Such embodiments allow the telephony party identifier to be subject to location-based processing to be used for outgoing messages from as device in the target geographic region(s).

In a second exemplary embodiment of the invention, there is provided a method of processing a message in a telephony network, the method comprising receiving a request message from an originating telephony device associated with a user, selecting an originating telephony party identifier from a plurality of possible originating telephony party identifiers, the possible originating telephony party identifiers being associated with different possible geographic locations of the user, and transmitting an outgoing request message using the selected originating telephony party identifier.

As such, an outgoing request message can be transmitted using a preferred, location-specific, originating telephony party identifier from a plurality of possible originating telephony party identifiers.

In some embodiments, said request message from the originating telephony device comprises a telephony party identifier representing the originating telephony device. In such embodiments, the telephony party identifier representing the originating telephony device may be used as a possible originating telephony party identifier for the outgoing request message.

In some embodiments, the telephony device is a mobile telephony device. In such embodiments, the mobile telephony device may be used in various different geographic locations and a preferred outgoing telephony party identifier can be selected based on the current location of the mobile telephony device.

Some embodiments comprise detecting a terminating telephony party identifier in the request message, and selecting a telephony party identifier representing the originating telephony device from the plurality of possible originating telephony party identifiers as the originating telephony party identifier. Such embodiments allow request messages for terminating telephony party identifiers to be processed in a specific manner. For example, a telephony party identifier natively associated with the originating telephony device can be used in a request message addressed to an emergency service so that there is no confusion on the part of the emergency service as to the origin of the request message.

Some embodiments comprise determining the geographic location of the originating telephony device. In such embodiments, the location of the originating telephony device can be used to select the originating telephony party identifier.

In some embodiments, said selected originating telephony party identifier comprises a telephone dialing number. Such embodiments provider a convenient form of originating telephony party identifier.

In some embodiments, the selected originating telephony party identifier comprises a SIP user identifier. Such embodiments provider a convenient form of originating telephony party identifier.

Some embodiments comprise transmitting an identifier selection request message to the originating telephony device, receiving an identifier selection response message from the originating telephony device, and selecting the originating identifier based on the identifier selection response message. Such embodiments may provide the user with an opportunity to be included in the selecting process, for example so that the user could select a more suitable outgoing telephony party identifier.

In a third exemplary embodiment of the invention, there is provided apparatus for processing an incoming request message and transmitting outgoing request messages to telephony devices located in various different geographic regions of a telephony system, the telephony devices in the telephony system including at least one group of potential recipient telephony devices, a said group of potential recipient devices including mobile telephony devices that can move between said various different geographic regions, the apparatus being arranged to:

receive an incoming request message, the incoming request message comprising a telephony party identifier;

recognise said telephony party identifier as a telephony party identifier to be subject to location-based processing;

determine a subgroup of said group of potential recipient telephony devices, said subgroup including a plurality of potential recipient telephony devices currently within one or more target geographic regions associated with the recognised telephony party identifier; and transmit an outgoing request message to each of a plurality of different telephony party identifiers associated with the plurality of potential recipient telephony devices in said subgroup, said plurality of different telephony party identifiers each being associated with a different potential recipient telephony device in said subgroup.

In a fourth exemplary embodiment of the invention, there is provided computer program product comprising a non-transitory computer-readable storage medium having computer readable instructions stored thereon, the computer readable instructions being executable by a computerized device to cause the computerized device to perform a method of processing an incoming request message and transmitting outgoing request messages to telephony devices located in various different geographic regions of a telephony system, the telephony devices in the telephony system including at least one group of potential recipient telephony devices, a said group of potential recipient devices including mobile telephony devices that can move between said various different geographic regions, the method comprising:

receiving an incoming request message, the incoming request message comprising a telephony party identifier;

recognising said telephony party identifier as a telephony party identifier to be subject to location-based processing;

determining a subgroup of said group of potential recipient telephony devices, said subgroup including a plurality of potential recipient telephony devices currently within one or more target geographic regions associated with the recognised telephony party identifier; and transmitting an outgoing request message to each of a plurality of different telephony party identifiers associated with the plurality of potential recipient telephony devices in said subgroup, said plurality of different telephony party identifiers each being associated with a different potential recipient telephony device in said subgroup.

In a fifth exemplary embodiment of the invention, there is provided apparatus for processing a message in a telephony network, the apparatus being arranged to receive a request message from an originating telephony device associated with a user, select an originating telephony party identifier from a plurality of possible originating telephony party identifiers, the possible originating telephony party identifiers being associated with different possible geographic locations of the user, and transmit an outgoing request message using the selected originating telephony party identifier.

In a sixth exemplary embodiment of the invention, there is provided a computer program product comprising a non-transitory computer-readable storage medium having computer readable instructions stored thereon, the computer readable instructions being executable by a computerized device to cause the computerized device to perform a method of processing a message in a telephony network, the method comprising receiving a request message from an originating telephony device associated with a user, selecting an originating telephony party identifier from a plurality of possible originating telephony party identifiers, the possible originating telephony party identifiers being associated with different possible geographic locations of the user, and transmitting an outgoing request message using the selected originating telephony party identifier.

The above embodiments are to be understood as illustrative examples of the invention. Further embodiments are envisaged.

For example, although embodiments have been described in which the incoming request messages are telephony messages in the form of call setup requests, other types of incoming request message and telephony message are envisaged.

Examples of such other types of telephony message include, but are not limited to being, SMS messages, one-way audio media messages and video data. In such cases, a suitably authorized originating party may be able to send an emergency alert to all mobile telephony devices in one or more target geographic regions) associated with a location-related telephony party identifier by addressing the emergency alert to the location-related telephony party identifier, rather than to each of the individual mobile telephony devices. Furthermore, the individual mobile telephony devices need not be pre-registered against the location-related telephony party identifier to receive the emergency alert.

In some embodiments in which a request message is transmitted to each of the mobile telephony party identifiers that is included in the group identifying data, the outgoing message may comprise location information that the mobile telephony devices compare against their current location (which they could determine by means of a GPS receiver) and only accept the message if they are currently located in one or more target geographic region(s) identified in the location information. In such cases, a mobile telephony device may have received the request message on the basis that it was determined to be located in the one or more target geographic region(s). However, the determination may have been based on legacy or inaccurate location information for the location of the mobile telephony device. In such cases, the mobile telephony device may discard the request message or process it in some other manner.

In some embodiments in which an originating telephony device transmits a request message for which an originating telephony party identifier is selected, the originating telephony device may comprise a call list that records the (incoming) telephony party identifier on which it received a call from a particular calling party. The recorded telephony party identifier can then be used as a default originating telephony party identifier for outgoing calls to that particular calling party in the future. The originating telephony device may also include a contacts application which records a default originating telephony party identifier for each contact which can be used as a default originating telephony party identifier for future calls to that party.

In some embodiments, one or more criteria may be used to select an originating telephony party identifier, such as the called party number, the time of day, the day of the week, presence information for the called and/or calling party and the like.

In some of the embodiments described above in which an incoming call setup request is transmitted to a group of mobile telephony party identifiers, the mobile telephony devices represented by the mobile telephony party identifiers are part of a simultaneous ring group associated with the telephony party identifier in that they are caused to ring simultaneously. In other embodiments, the mobile telephony devices may form part of a sequential ring group associated with the telephony party identifier in which the mobile telephony devices are caused to ring in a sequence, for example based on a priority assigned to each mobile telephony device.

Some of the embodiments described above primarily relate to (mobile) telephony devices having associated identities in the form of (mobile) telephone dialing numbers. In other embodiments, one or more, or all of the identities could be non-telephone-dialing-numbers, for example usernames, email addresses etc. Where non-telephone-dialing-number identities are employed, mappings between non-telephone-dialing-number identities and telephone dialing number identities may be used by the service platform 108, which may be the softswitch 1608, for converting from non-telephone-dialing-number identities to telephone dialing numbers after receipt of the call party details.

In some embodiments, at least one of two call parties may use a VoIP-enabled device, and one, or each, party may be identified in call setup procedures by means of a unique identifier other than a telephony dialing number, for example a Session Initiation Protocol (SIP) identifier, which can be transmitted to the service platform 108 or the softswitch 1608 as a telephony party identifier identifying the other participant in the call.

The computing device 102 described above could be another device or combination of devices with corresponding data processing, display and data input capabilities, for example a television, a smart television, an in-car computing and communications system, a satellite navigation system, games console, or any combination thereof.

In some of the embodiments described above, the telecommunications system 100 includes a telephony network 101, which is a mobile telephony network, such as a GSM network. Other mobile telephony networks may be suitable, such as a General Packet Radio Service (GPRS) network, an Enhanced Data Rates for GSM Evolution (EDGE) network, a Universal Mobile Telecommunications Service (UMTS) network, a 4G network such as a Long Term Evolution (LTE or LTE Advanced) network, a Code Division Multiple Access-One (CDMAOne) network, a Code Division Multiple Access-2000 (CDMA2000) network or the like. In other embodiments, the telephony network 101 may comprise fixed telephony network, such as a Public Switched Telephony Network (PSTN). In some embodiments, the telephony network 101 is or comprises an IP-based network such as may be implemented by a Local Area Network (LAN), Wide Area Network (WAN), a Wireless Local Area Network (WLAN) based on the IEEE 802.11 standards, the Internet, an intranet or the like.

In some of the embodiments described above, the computing device 102 accesses the Internet via a PSTN or ISDN connection. The computing device 102 could also access the Internet via another suitable connection, such as an Asymmetric Digital Subscriber Line (ADSL) connection, a cable television (CATV) connection or the like.

In some of the embodiments described above, the mobile telephony devices are mobile telephones. However, it will be appreciated that the mobile telephony devices could be, for example, PDAs, mobile PCs (such as a laptop or tablet computer), pagers or the like. It will also be appreciated that the mobile telephony devices may be of the same or different types.

In some of the embodiments described above, the mobile telephony party identifier (a telephony party identifier associated with a mobile telephony device) is an MSISDN. However, other types of mobile telephony party identifier may be used where more appropriate. For example, the mobile telephony party identifier may comprise an Internet protocol (IP) address (for example if the mobile telephony device it represents is compatible with Voice over IP (VoIP) communications).

An example is given above of a network-based location determination using a CID system. However, other network-based location determination systems are envisaged.

Another example of a network-based determination is an Angle Of Arrival (AOA) LCS method in which the GSM network listens for signals from the mobile telephony device at two BTSs that include directional antennas or antenna arrays. The angle of arrival of the signal from the mobile telephony device is determined at each of the BTSs and the location of the mobile telephony device can be calculated by triangulation.

Another example of a network-based location determination is a Time of Arrival (TOA) method in which the GSM network listens for signals from the mobile telephony device at three BTSs and determines the distance of the mobile telephony device from each of the BTSs using trilateration based on the amount of time it takes the signal to reach the respective BTSs from the mobile telephony device. Each of the distance calculations for the respective BTSs places the mobile telephony device on the surface of a sphere with the respective BTS at the centre of the sphere; the determined location of the mobile telephony device being the intersection of the three spheres.

Another example is a Time Difference of Arrival (TDOA) LCS method in which the GSM network listens for signals from the mobile telephony device and calculates the location of the mobile telephony device using multilateration based on the time difference between the signals it receives, rather than using the absolute propagation time of the signals, as is the case with the TOA approach. By calculating the time difference of arrival of the signal from the mobile telephony device at two BTSs, the mobile telephony device can be determined to be on the surface of one half of a two-sheeted hyperboloid. A time difference of arrival calculation involving third BTSs produces a second time difference measurement and hence another half of a two-sheeted hyperboloid on the surface of which the mobile telephony device could be located. The intersection of the two possible location points for the mobile telephony device is determined to be the actual position of the mobile telephony device. A network-based TDOA location determination is sometimes referred to as an Uplink TODA (U-TDOA) calculation to distinguish from a TDOA determination in which the mobile telephony device is more actively involved.

An example is given above of a device-based or device-assisted location determination based on using a GPS receiver in the device. However, other device-based or device-assisted location determination systems are envisaged.

Another example of a device-based location system, is Enhanced Observed Time Difference (E-OTD) in which the mobile telephony device measures the time difference of arrival of bursts received from nearby BTSs. E-OTD is similar to the U-TDOA technique described above but is performed at the mobile telephony device itself instead of within the GSM network. This location system is implemented within the mobile telephony device and may require a software update at the mobile telephony device to enable it to employ this functionality.

An example is given above of location determination using a Local Positioning System (LPS) in which the system is a WiFi-based Positioning System (WPS). However, other LPSs are envisaged.

Another example of an LPS is one in which a location beacon broadcasts its location to nearby telephony devices. By detecting the broadcast, the telephony device can determine that it is near to the beacon and can thereby determine its position.

Other location determination mechanisms are also envisaged that include, but are not limited to being, Radio-frequency Identification (RFID) and Bluetooth™ (short range) location systems, detecting user login at a telecommunications device having a known geographic location, Advanced Forward Link Trilateration (AFLT), Received Signal Strength Indicator (RSSI), ultrasound or infrared location systems.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing an incoming request message and transmitting outgoing request messages to telephony devices located in various different geographic regions of a telephony system, the telephony devices in the telephony system including at least one group of potential recipient telephony devices, a said group of potential recipient devices including mobile telephony devices that can move between said various different geographic regions, the method comprising:

receiving an incoming request message, the incoming request message comprising a telephony party identifier;

recognising said telephony party identifier as a telephony party identifier to be subject to location-based processing;

determining a subgroup of said group of potential recipient telephony devices, said subgroup including a plurality of potential recipient telephony devices currently within one or more target geographic regions associated with the recognised telephony party identifier;

transmitting an outgoing request message to each of a plurality of different telephony party identifiers associated with the plurality of potential recipient telephony devices in said subgroup, said plurality of different telephony party identifiers each being associated with a different potential recipient telephony device in said subgroup;

transmitting outgoing request messages originating from telephony devices in said group; and setting the telephony party identifier, which is subject to location-based processing for an incoming request message, as an originating telephony party identifier for an outgoing request message when the associated device is in the one or more target geographic regions.

2. The method according to claim 1, further comprising transmitting an outgoing request message to all of the different telephony party identifiers associated with the one or more potential recipient telephony devices in said subgroup.

3. The method according to claim 1, wherein the incoming request message comprises an incoming signalling message.

4. The method according to claim 3, wherein the incoming signalling message comprises an incoming telephone call setup request.

5. The method according to claim 1, wherein the telephony party identifier, which is recognised as the telephony party identifier to be subject to location-based processing, comprises a telephone dialing number.

6. The method according to claim 1, wherein the telephony party identifier, which is recognised as the telephony party identifier to be subject to location-based processing, comprises a Session Initiation Protocol (SIP) telephony party identifier.

7. The method according to claim 1, wherein the telephony devices in the telephony system include a plurality of groups of potential recipient telephony devices, and wherein the telephony party identifier, which is recognised as the telephony party identifier to be subject to location-based processing, uniquely identifies a group of potential recipient telephony devices.

8. The method according to claim 1, wherein the telephony party identifier, which is recognised as the telephony party identifier to be subject to location-based processing, comprises a geographic region identifier identifying the one or more target geographic regions.

9. The method according to claim 8, wherein the geographic region identifier includes geographic coordinate data identifying a target geographical region.

10. The method according to claim 1, wherein the subgroup includes one or more mobile telephony devices as potential recipient telephony devices currently within the one or more target geographic regions associated with the recognised telephony party identifier, and wherein said determining comprises determining a current location of said one or more mobile telephony devices.

11. The method according to claim 10, wherein said determining the current location comprises transmitting location request messages to one or more mobile telephony devices in said group and receiving location response messages from said one or more mobile telephony devices in said group.

12. The method according to claim 11, wherein said transmitting location request messages is prior to receiving the incoming request message.

13. The method according to claim 10, wherein said determining the current location comprises obtaining location information for one or more mobile telephony devices in said group from a location service provider.

14. The method according to claim 10, further comprising storing subgroup identifying data for identifying telephony devices in said subgroup;

adding a mobile telephony device to the subgroup identifying data upon detecting that a mobile telephony device in said group is currently within the one or more target geographic regions associated with the telephony party identifier to be subject to location-based processing; and removing said mobile telephony device from the subgroup identifying data upon detecting that said mobile telephony device in said group is not currently within the one or more target geographic regions associated with the telephony party identifier to be subject to location-based processing.

15. The method according to claim 10, further comprising storing group identifying data for identifying telephony devices in said group, monitoring mobile telephony devices within the one or more target geographic regions and, upon detecting a mobile telephony device having a mobile telephony party identifier that is not included in the group identifying data for the one or more target geographic regions, transmitting an invitation to the detected mobile telephony device to have the mobile telephony party identifier representing the detected mobile telephony device included in the group identifying data.

16. The method according to claim 1, further comprising storing group identifying data for identifying telephony devices in said group.

17. The method according to claim 16, further comprising receiving from a user a request to have a telephony party identifier representing a telephony device included in the group identifying data, and including the telephony party identifier representing the telephony device in said group identifying data.

18. The method according to claim 1, further comprising receiving an incoming request message originating from a telephony device in said group, and replacing an originating telephony party identifier in said received incoming request message with the telephony party identifier, which is subject to location-based processing for an incoming request message, as an originating telephony party identifier in the outgoing request message when the associated device is in the one or more target geographic regions.

19. An apparatus for processing an incoming request message and transmitting outgoing request messages to telephony devices located in various different geographic regions of a telephony system, the telephony devices in the telephony system including at least one group of potential recipient telephony devices, a said group of potential recipient devices including mobile telephony devices that can move between said various different geographic regions, the apparatus being arranged to:

receive an incoming request message, the incoming request message comprising a telephony party identifier;

recognise said telephony party identifier as a telephony party identifier to be subject to location-based processing;

determine a subgroup of said group of potential recipient telephony devices, said subgroup including a plurality of potential recipient telephony devices currently within one or more target geographic regions associated with the recognised telephony party identifier;

transmit an outgoing request message to each of a plurality of different telephony party identifiers associated with the plurality of potential recipient telephony devices in said subgroup, said plurality of different telephony party identifiers each being associated with a different potential recipient telephony device in said subgroup;

transmit outgoing request messages originating from telephony devices in said group; and set the telephony party identifier, which is subject to location-based processing for an incoming request message, as an originating telephony party identifier for an outgoing request message when the associated device is in the one or more target geographic regions.

20. A computer program product comprising a non-transitory computer-readable storage medium having computer readable instructions stored thereon, the computer readable instructions being executable by a computerized device to cause the computerized device to perform a method of processing an incoming request message and transmitting outgoing request messages to telephony devices located in various different geographic regions of a telephony system, the telephony devices in the telephony system including at least one group of potential recipient telephony devices, a said group of potential recipient devices including mobile telephony devices that can move between said various different geographic regions, the method comprising:

receiving an incoming request message, the incoming request message comprising a telephony party identifier;

recognising said telephony party identifier as a telephony party identifier to be subject to location-based processing;

determining a subgroup of said group of potential recipient telephony devices, said subgroup including a plurality of potential recipient telephony devices currently within one or more target geographic regions associated with the recognised telephony party identifier;

transmitting an outgoing request message to each of a plurality of different telephony party identifiers associated with the plurality of potential recipient telephony devices in said subgroup, said plurality of different telephony party identifiers each being associated with a different potential recipient telephony device in said subgroup;

transmitting outgoing request messages originating from telephony devices in said group; and setting the telephony party identifier, which is subject to location-based processing for an incoming request message, as an originating telephony party identifier for an outgoing request message when the associated device is in the one or more target geographic regions.

* * * * *